US012717551B1

(12) United States Patent
Taaghol

(10) Patent No.: US 12,717,551 B1
(45) Date of Patent: Aug. 25, 2026

(54) SOFTWARE-AS-AN-INTELLECTUAL PROPERTY SYSTEM AND METHOD

(71) Applicant: Pouya Taaghol, San Mateo, CA (US)

(72) Inventor: Pouya Taaghol, San Mateo, CA (US)

( * ) Notice: Subject to any disclaimer, the term of this patent is extended or adjusted under 35 U.S.C. 154(b) by 3 days.

(21) Appl. No.: 19/393,489

(22) Filed: Nov. 18, 2025

Related U.S. Application Data

(60) Provisional application No. 63/734,283, filed on Dec. 16, 2024.

(51) Int. Cl.
*G06F 8/30* (2018.01)
*G06F 21/12* (2013.01)
*G06Q 50/18* (2012.01)

(52) U.S. Cl.
CPC ............ *G06F 8/30* (2013.01); *G06Q 50/184* (2013.01); *G06F 21/125* (2013.01)

(58) Field of Classification Search
None
See application file for complete search history.

(56) References Cited

U.S. PATENT DOCUMENTS 7,277,904 B2 * 10/2007 Baird .................. G06Q 50/184
8,260,931 B2 9/2012 Balasubramanian
8,656,453 B2 2/2014 Punnoose
9,300,688 B2 3/2016 Morrison
9,494,111 B2 11/2016 Hang
9,531,753 B2 12/2016 Morrison
9,602,344 B1 3/2017 Iyengar
10,079,681 B1 9/2018 Roth
10,776,459 B2 9/2020 Bojjireddy
10,810,321 B2 10/2020 Morrison
10,831,913 B2 11/2020 Li
10,872,029 B1 12/2020 Albouneh
10,972,277 B2 4/2021 Innis
11,023,567 B2 6/2021 Loisel
11,032,369 B1 6/2021 Wei
11,153,325 B1 10/2021 Igolnik
11,157,597 B2 10/2021 Kwon
11,200,048 B2 12/2021 Karve
11,494,493 B1 11/2022 Bair
11,609,723 B2 3/2023 Nuggehali
11,823,145 B2 11/2023 Wong
(Continued)

OTHER PUBLICATIONS

US 9,942,041 B1, 04/2018, Kisser (withdrawn)
(Continued)

*Primary Examiner* — Ryan D. Coyer
(74) *Attorney, Agent, or Firm* — ROARK IP

(57) ABSTRACT

This disclosure offers an end-to-end system and method to enable companies to create differentiating capabilities rapidly by tapping into a large pool of independent software vendors (ISV) while protecting and utilizing enterprise's proprietary digital resources. Examples of such resources include data and compute/storage infrastructure including Large Language Model (LLM) infrastructure. This disclosure enables complete separation of ISV's developed intellectual property (SoftIP) such as code/processes from enterprise data and resources. In addition, this system and method enables the SoftIP to be executed at a third party facility secured with advanced cryptographic technologies to ensure code integrity and secure access to enterprise's proprietary digital assets.

10 Claims, 17 Drawing Sheets

(56) References Cited

U.S. PATENT DOCUMENTS

| | | | | |
|---|---|---|---|---|
| 11,841,698 | B2 | 12/2023 | Hofele | |
| 11,847,232 | B2 | 12/2023 | Fabjanski | |
| 11,886,601 | B2 | 1/2024 | Goldstone | |
| 12,003,517 | B2 | 6/2024 | Narayan | |
| 2019/0392155 | A1* | 12/2019 | Eldefrawy | G06F 21/602 |
| 2020/0004934 | A1* | 1/2020 | Garreau | G06F 21/125 |
| 2021/0117513 | A1* | 4/2021 | Kapoor | G06F 21/105 |
| 2021/0334770 | A1* | 10/2021 | Lee | G06Q 20/1235 |
| 2023/0113947 | A1* | 4/2023 | Spangenberg | G06F 16/27 705/310 |
| 2023/0161915 | A1* | 5/2023 | Landman | G06F 21/64 713/176 |
| 2023/0259787 | A1* | 8/2023 | David | G06N 3/0455 706/15 |
| 2023/0281705 | A1* | 9/2023 | Aviv | G06Q 20/1235 705/26.3 |
| 2025/0045852 | A1* | 2/2025 | Lewis | G06Q 30/0185 |
| 2025/0217121 | A1* | 7/2025 | Xie | G06F 8/71 |
| 2025/0265076 | A1* | 8/2025 | Vattikutti | G06F 8/71 |
| 2025/0342231 | A1* | 11/2025 | Wells | G06N 20/00 |

OTHER PUBLICATIONS

Azeta et al., "A Code Obfuscation Framework for Software and Intellectual Property Protection," IEEE , 2024. (Year: 2024).*

Baralla et al., "Assessing GitHub Copilot in Solidity Development: Capabilities, Testing, and Bug Fixing," IEEE, 2024. (Year: 2024).*

Bei et al., "Software Intellectual Property Management through Self-claiming of the Certificate of Origin of the Source Code," IEEE, 2013. (Year: 2013).*

Gim et al., "Confidential Prompting: Protecting User Prompts from Cloud LLM Providers," arXiv, 2024. (Year: 2024).*

Shmatkov, Daniil, "Intellectual Property Management of Industrial Software Products: The Case of Triol Corp.," IEEE, 2021. (Year: 2021).*

Zeng et al., "Research on Key Technology of Software Intellectual Property Protection," IEEE, 2021. (Year: 2021).*

* cited by examiner

100

100

SOFTWARE-AS-AN-INTELLECTUAL PROPERTY SYSTEM AND METHOD

REFERENCE TO RELATED APPLICATION

This application claims the benefit of U.S. Provisional Patent Application Ser. No. 63/734,283, filed Dec. 16, 2024; this application is incorporated herein by reference.

FIELD OF THE DISCLOSURE

The present disclosure relates to the field of secure software licensing and execution, and more particularly to a system and method for controlled, verifiable distribution, deployment, and execution of third-party software applications using cryptographic controls, blockchain-based license tracking, and standardized resource management.

BACKGROUND OF THE DISCLOSURE

In this era of big data, the amount of tools that can help the user gain insights is nearly limitless. But not all insights are created equally, and there is a major gap when it comes to execution, a wide valley between having access to large amounts of data and being able to use it. Part of this gap has to do with the limitations of a given data source: every platform and tool has its own way of gathering and visualizing data, so the user has to be discerning when deciding which tools to go with.

SUMMARY

Aspects of the disclosure include a method comprising: running Software Intellectual Property (SoftIP) code in a third party secure cloud provider; freezing the SoftIP code and recording the SoftIP code to an escrow provider to ensure consistency; requiring changes to the SoftIP code initiated by SoftIP Developer to be approved by a SoftIP client; and sending the results of executing the SoftIP code to a SoftIP client, wherein the SoftIP client cannot see the SoftIP code which may use proprietary data and resources.

Aspects of the disclosure further include a system comprising: a Software Intellectual Property (SoftIP) cloud host provider configured to run SoftIP code created by a SoftIP developer, control access to resources, and verify code integrity using certified tools and verified resources; a SoftIP escrow provider configured to receive, store, and verify cryptographically signed software code packages and revisions, wherein the SoftIP escrow provider is configured to freeze the SoftIP code and record the SoftIP code to an escrow provider to ensure consistency; a SoftIP client capable of receiving the results of executing the SoftIP code by the SoftIP cloud host provider, wherein the SoftIP client cannot see the SoftIP code which may use proprietary data and resources; and wherein changes to the SoftIP code initiated by a SoftIP developer to be approved by a SoftIP client.

Aspects of the disclosure a system for software-as-an-intellectual-property (SoftIP) license transfer, comprising: a SoftIP store configured to register, certify, and distribute software code packages from SoftIP developers; a SoftIP escrow provider configured to receive, store, and verify cryptographically signed software code packages and revisions; a certificate authority configured to issue digital certificates authenticating developers, clients, and cloud hosts; a SoftIP cloud host provider configured to execute code, control access to resources, and verify code integrity using certified tools and verified resources; and a blockchain network configured to record license transfers, resource identifiers, and code revision identifiers for peer-to-peer transfers.

BRIEF DESCRIPTION OF THE DRAWINGS

Embodiments of this disclosure are illustrated by way of example. While various details of one or more techniques are described herein, other techniques are also possible. In some instances, well-known structures and devices are shown in block diagram form in order to facilitate describing various techniques. A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one portion or part of a larger element or one of multiple similar components. When reference is made to a reference numeral without specification to an existing sub-label, the reference numeral refers to all such similar components.

DETAILED DESCRIPTION OF THE DISCLOSURE

The following terms, acronyms, abbreviations and descriptions are explained below and are used throughout the detailed description of this document.

| TERM | DESCRIPTION |
|---|---|
| API | Application Programmable Interface |
| CA | Certificate Authority |
| CRN | Code Revision Number |
| IP | Intellectual Property |
| ISV | Independent Software Vendor |
| MUDI | Mandatory Unique Data Identifier |
| MURI | Mandatory Unique Resource Identifier |
| SoftIP | Software Intellectual Property |
| SaaIP | Software-As-An-Intellectual-Property |
| SaaS | Software-As-A-Service |
| UCI | Unique Code Identifier |
| UDE | Unique Data Identifier |
| UDI | Unique Developer Identifier |
| URI | Unique Resource Identifier |
| UUI | Unique User Identifier |

FIGS. 1-6 relate to various types of generalized system architectures or configurations on which the approaches shown in FIGS. 7A-15 may be employed. Correspondingly, these system and platform examples may also relate to systems and platforms on which the techniques discussed herein may be implemented or otherwise utilized.

Enterprise demand for software and services of all types is exploding. Companies of all sizes have been collecting large amount of very valuable proprietary and public domain data (contextual and numeric). It is paramount to build competitive differentiation with these precious data using Artificial Intelligence (AI) and machine learning techniques to analyze, optimize, forecast, detect frauds, and offer competitive products. The existing solutions include licensed 3rd party software applications, Software-as-a-Service (SaaS) applications, and in-house software applications do not provide differentiating capabilities to the enterprise by tapping into a large pool of independent software vendors (ISV) while protecting enterprise's proprietary digital assets (such as data) and ISV's developed intellectual property. This disclosure offers a novel end-to-end system architecture to enable companies to create differentiating capabilities rapidly by tapping into a large pool of independent software vendors (ISV) while protecting enterprise's proprietary digital assets (such as data) and ISV's developed intellectual property. We refer to this system architecture Software-as-an-Intellectual Property (SaaIP).

Figure 1:
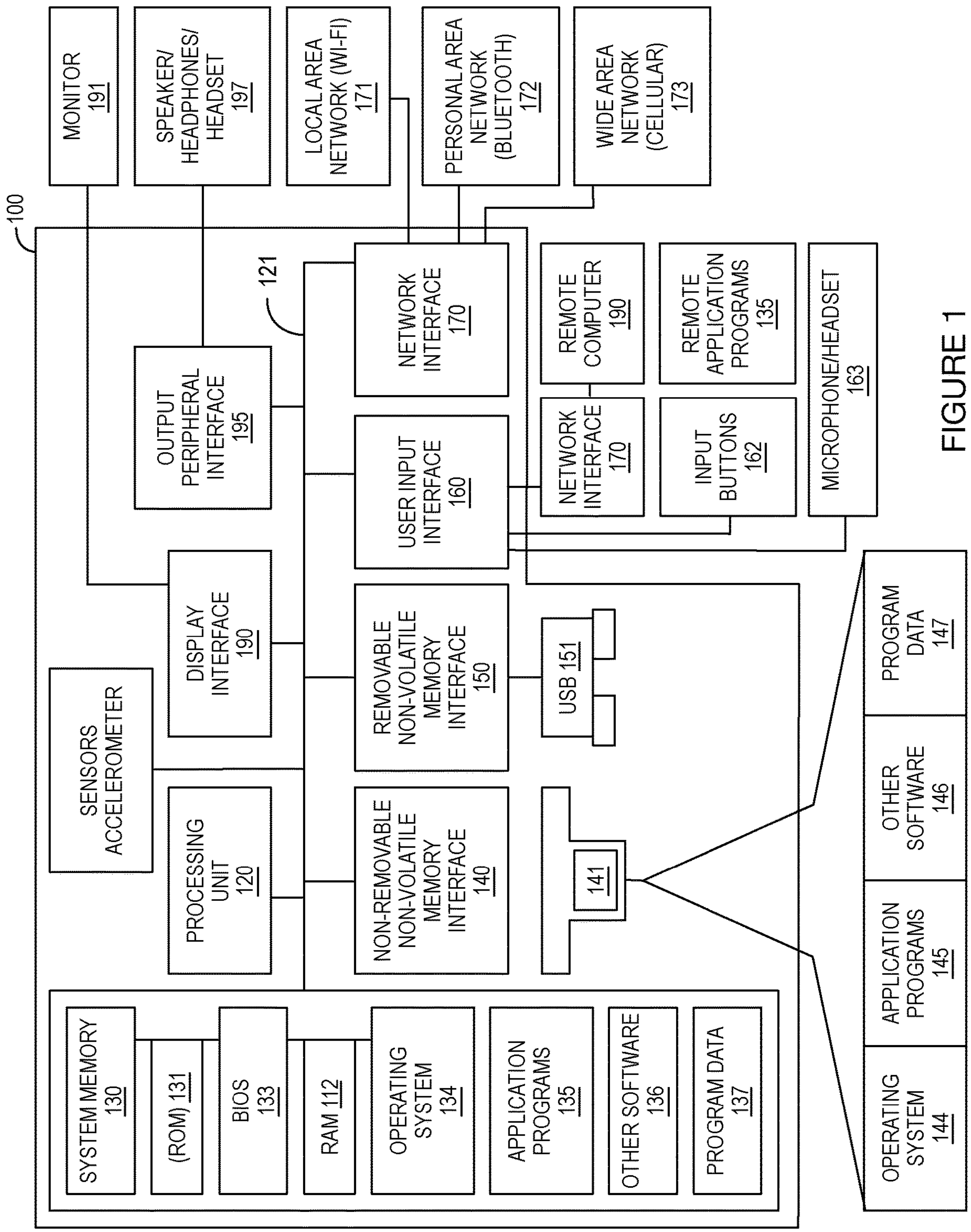
FIG. 1 is a block diagram of a number of electronic systems and devices communicating with each other in a network environment which form the base electronics for the embodiments disclosed in FIGS. 2-15 of this disclosure.

FIG. 1 illustrates a computing SaaIP system and method 100 that can be, wholly or partially, part of one or more of a server or client computing devices in accordance with embodiments disclosed herein. As used herein, the terms "module", "application", "engine", "program", or "plugin" refers to one or more sets of computer software instructions (e.g., computer programs and/or scripts) executable by one or a plurality of processors of a computing system to provide particular functionality. Computer software instructions can be written in any suitable programming languages, such as C, C++, C#, Pascal, Fortran, Perl, MATLAB, SAS, SPSS, JavaScript, AJAX, JAVA and Python. Such computer software instructions can comprise an independent application with data input and data display modules. Alternatively, the disclosed computer software instructions can be classes that are instantiated as distributed objects. Additionally, the disclosed applications, modules or engines can be implemented in computer software, computer hardware, or a combination thereof. As used herein, the terms "system", "platform", and "framework" refer to a system of applications, and/or engines, as well as any other supporting data structures, libraries, modules, and any other supporting functionality, that cooperate to perform one or more overall functions.

With reference to FIG. 1, components of the Software-As-An-Intellectual Property (SaaIP) system and method 100 which allows for a Software Intellectual-Property (SoftIP) license transfer model. SaaIP system and method 100 can include, but are not limited to, a processing unit 120 having one or more processing cores, a system memory 130, and a system bus 121 that couples various system components including the system memory 130 to the processing unit 120. The system bus 121 may be any of several types of bus structures selected from a memory bus or memory controller, a peripheral bus, and a local bus using any of a variety of bus architectures.

SaaIP system and method 100 includes a variety of computing machine-readable media. Computing machine-readable media can be any available media that can be accessed by SaaIP system and method 100 and includes both volatile and nonvolatile media, and removable and non-removable media. The system memory 130 includes computer storage media in the form of volatile and/or nonvolatile memory such as read only memory (ROM) 131 and random access memory (RAM) 132. A basic input/output system 133 (BIOS) is typically stored in ROM 131. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the SaaIP system and method 100. Communication media typically embody computer readable instructions, data structures, other executable software, or other transport mechanism and includes any information delivery media. As an example, some client computing systems on a network might not have optical or magnetic storage. RAM 132 typically contains data and/or software that are immediately accessible to and/or presently being operated on by the processing unit 120. The RAM 132 can include a portion of the operating system 134, application programs 135, other executable software 136, and program data 137. The SaaIP system and method 100 can also include other removable/non-removable volatile/nonvolatile computer storage media. By way of example only, FIG. 1 illustrates a memory 141 and a non-removable non-volatile memory interface 140. Other removable/non-removable, volatile/nonvolatile computer storage media that can be used in the example operating environment include, but are not limited to, a universal serial bus (USB) 151, flash memory, RAM, or ROM. USB 151 is typically connected to the system bus 121 by a removable memory interface, such as interface 150. In FIG.

1, for example, the memory 141 is illustrated for storing operating system 144, application programs 145, other executable software 146, and program data 147. Operating system 144, application programs 145, other executable software 146, and program data 147 are given different numbers.

A user may enter commands and information into the SaaIP system and method 100 through input devices such as a keyboard, touchscreen, or software or hardware input buttons 162, a microphone 163, a pointing device and/or scrolling input component, such as a mouse, trackball or touch pad. The microphone 163 can cooperate with speech recognition software. These and other input devices are often connected to the processing unit 120 through a user input interface 160 that is coupled to the system bus 121, but can be connected by other interface and bus structures, such as a parallel port, or a universal serial bus (USB). A display monitor 111 or other type of display screen device is also connected to the system bus 121 via an interface, such as a display interface 110. In addition to the monitor 111, computing devices may also include other peripheral output devices such as speakers 117 and other output devices, which may be connected through an output peripheral interface 115.

The computing SaaIP system and method 100 can operate in a networked environment using logical connections to one or more remote computers/client devices, such as a remote computing system 190. The remote computing system 190 can be a personal computer, a hand-held device, a server, a router, a network PC, a peer device or other common network node, and typically includes many or all of the elements described above relative to the computing SaaIP system and method 100. Remote application programs 135 can reside on remote computing device 190.

The logical connections depicted in FIG. 1 can include a personal area network ("PAN") 172 (e.g., Bluetooth®), a local area network ("LAN") 171 (e.g., Wi-Fi), and a wide area network ("WAN") 173 (e.g., cellular network), but may also include other networks. Such networking environments are commonplace in offices, enterprise-wide computer networks, intranets and the Internet. A browser application may be resident on the computing device and stored in the memory.

When used in a LAN networking environment, the SaaIP system and method 100 is connected to the LAN 171 through a network interface or adapter 170, which can be, for example, a Bluetooth® or Wi-Fi adapter. When used in a WAN networking environment (e.g., Internet), the SaaIP system and method 100 typically includes some means for establishing communications over the WAN 173. It should be noted that the present configuration can be carried out on a computing system such as that described with respect to FIG. 1. However, the present configuration can be carried out on a server, a computing device devoted to message handling, or on a distributed system in which different portions of the present design are carried out on different parts of the distributed computing system.

In an exemplary embodiment, software used to facilitate processes and methods 100 discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note that the SaaIP system and method 100 described herein includes but is not limited to software applications, mobile applications, and programs that are part of an operating system application. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These processes can be written in a number of different software programming languages such as PYTHON™, JAVA™, HTTP, C, C+, or other similar languages. Also, a process can be implemented with lines of code in software, configured logic gates in software, or a combination of both. In an embodiment, the logic consists of electronic circuits that follow the rules of Boolean Logic, software that contain patterns of instructions, or any combination of both. Many functions performed by electronic hardware components can be duplicated by software emulation. Thus, a software program written to accomplish those same functions can emulate the functionality of the hardware components in input-output circuitry.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIGS. 1-15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the system and method 100 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

Figure 2:
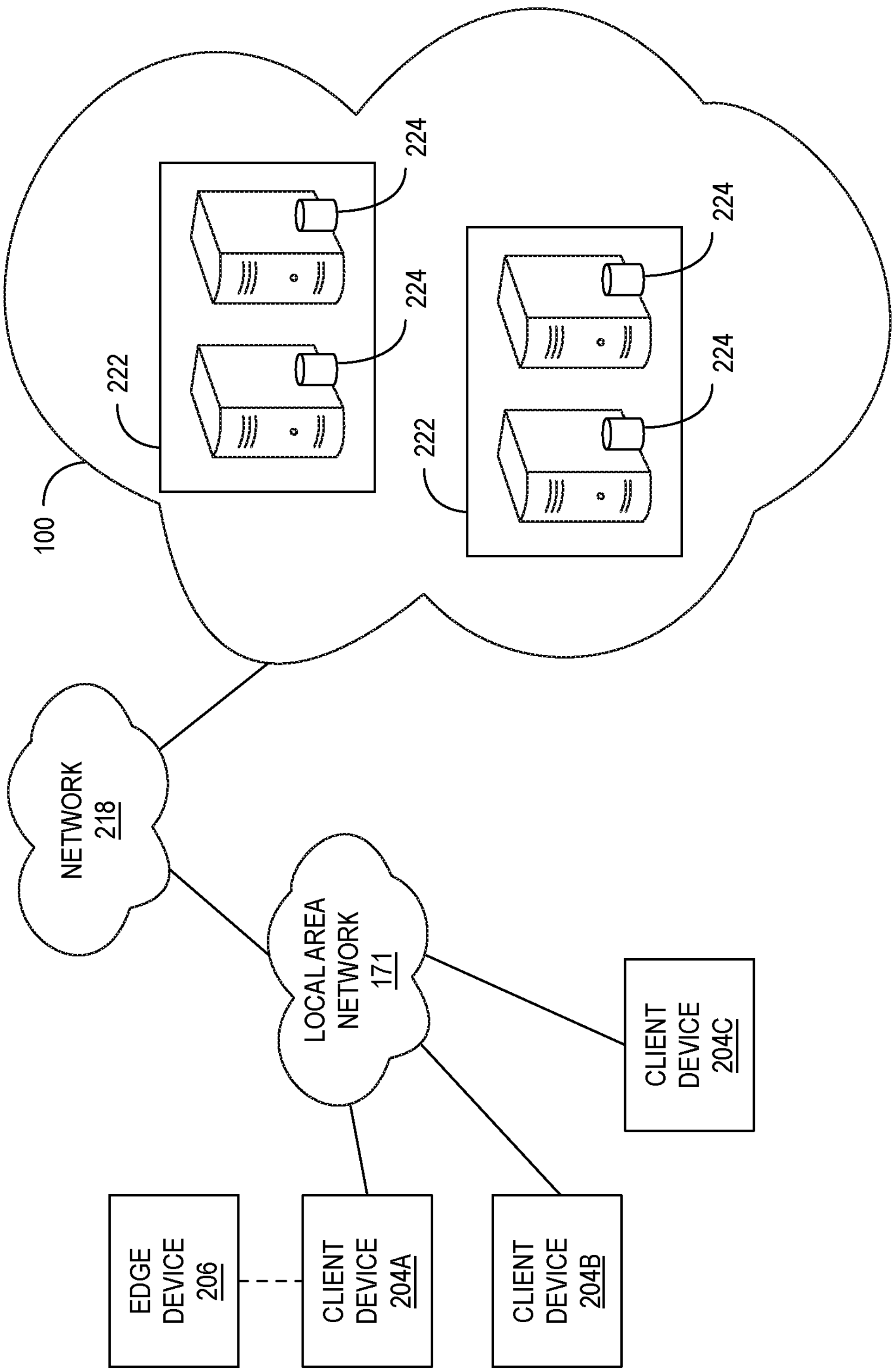
FIG. 2 is a block diagram of an example of a cloud computing environment in which embodiments of the present technique may operate.

FIG. 2 is a block diagram of an embodiment of a cloud computing system in which embodiments of the computing SaaIP system and method 100 may operate. SaaIP system and method 100 may be a cloud based platform connected the local area network 171 (see FIG. 1) and network 218 (e.g., the Internet). In one embodiment, the local area network 171 may be a variety of network devices that include, but are not limited to, switches, servers, and routers. As shown in FIG. 2, the local area network 171 is able to connect to one or more client devices 204A, 204B, and 204C so that the client devices are able to communicate with each other and/or with the network hosting the SaaIP system and method 100. The client devices 204A-C may be computing systems and/or other types of computing devices generally referred to as Internet of Things (IoT) devices that access cloud computing services, for example, via a web browser application or via an edge device 206 that may act as a gateway between the client devices and the SaaIP system and method 100.

FIG. 2 illustrates that LAN 171 is coupled to network 218. The network 218 may include one or more computing networks, such as other LANs, wide area networks (WAN), the Internet, and/or other remote networks, to transfer data between the client devices 204A-C and the network hosting the SaaIP system and method 100. Each of the computing networks within network 218 may contain wired and/or wireless programmable devices that operate in the electrical and/or optical domain.

In FIG. 2, the network hosting the SaaIP system and method 100 may be a remote network (e.g., a cloud network) that is able to communicate with client devices 204A-C via LAN 171 and network 218. By utilizing the network hosting the SaaIP system and method 100, users of client devices 204A-C are able to build and execute applications for various enterprise, IT, and/or other organization-related functions. In one embodiment, the network hosting the SaaIP system and method 100 is implemented on one or more data centers 222, where each data center could correspond to a different geographic location. Each of the data centers 222 includes a plurality of virtual servers 224, where each virtual server can be implemented on a physical computing system, such as a single electronic computing device (e.g., a single physical hardware server) or across multiple-computing devices (e.g., multiple physical hardware servers). Examples of virtual servers 224 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the SaaIP system and method 100, network operators may choose to configure the data centers 222 using a variety of computing infrastructures. In one embodiment, one or more of the data centers 222 are configured using a multi-tenant cloud architecture, such that one of the server instances 224 handles requests from and serves multiple customers. Data centers with multi-tenant cloud architecture commingle and store data from multiple customers, where multiple customer instances are assigned to one of the virtual servers 224. In a multi-tenant cloud architecture, the particular virtual server 224 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 224 causing outages for all customers allocated to the particular server instance.

In another embodiment, one or more of the data centers 222 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 224, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the SaaIP system and method 100, and customer-driven upgrade schedules.

Figure 3:
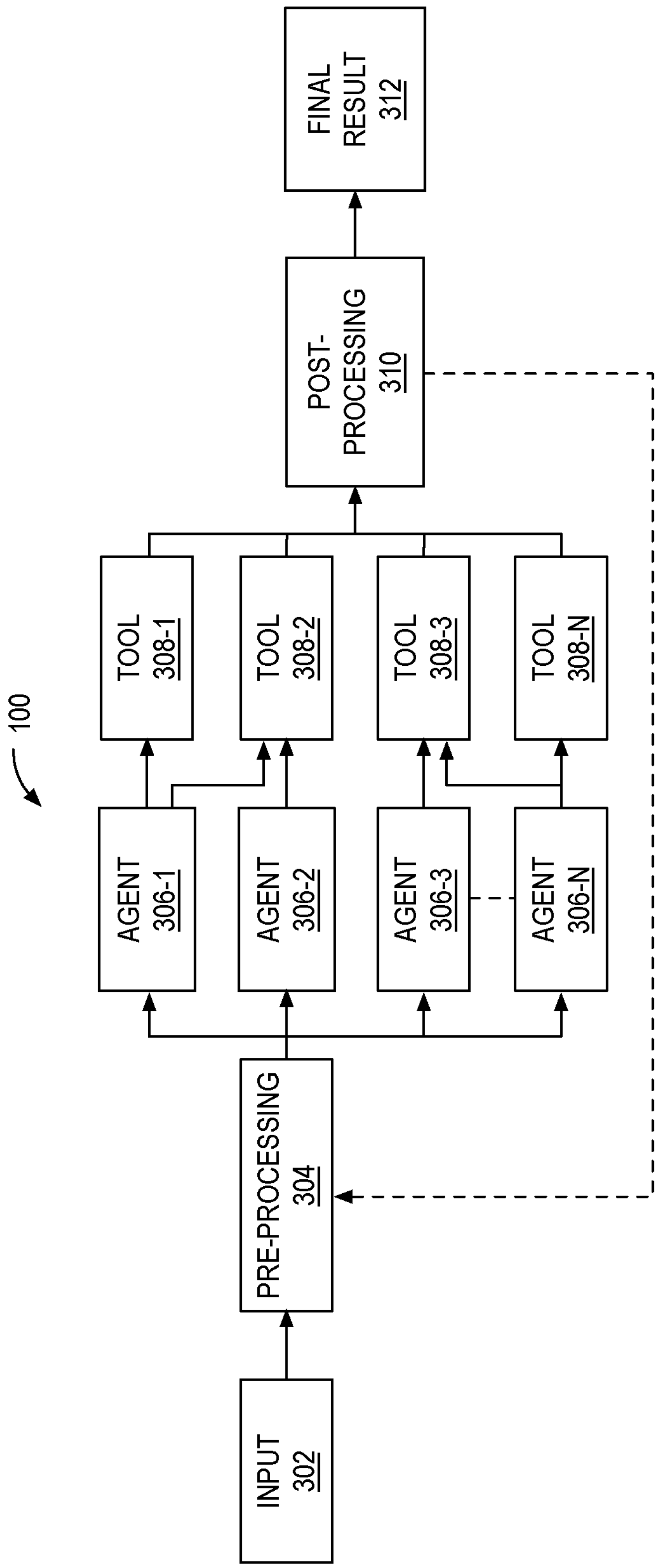
FIG. 3 depicts a diagram of an example logical flow of an enterprise generative artificial intelligence system according to some embodiments. Post-processed inputs are into one or more agent and tools required for execution logic of a Software Intellectual Property (SoftIP).

FIG. 3 depicts a diagram of the computer SaaIP system and method 100 implemented in a specialized enterprise generative artificial intelligence system according to some embodiments. Post-processed inputs are into one or more agent and tools required for execution logic of a SoftIP. Artificial intelligence (AI) is a branch of computer science for the development of software that allows computer systems to perform tasks that imitate human cognitive intelligence, such as visual perception, speech recognition, decision-making, and language translation. Traditional approaches for storing and retrieving information typically involves databases and applications to index search and locate specific files. Generative AI is an artificial intelligence technology that uses machine learning processes to perform tasks that imitate human cognitive intelligence and generate content. Content can be in the form of text, audio, video, images, and more. Content in enterprise computing environments is typically spread across disparate data sources that may be incompatible, siloed, and access controlled.

A specialized enterprise generative artificial intelligence system can further use a combination of agents and tools to efficiently process a wide variety of inputs received from disparate data sources (e.g., having different data formats) and return results in a common data format. The specialized enterprise generative artificial intelligence architecture includes an orchestrator agent (or, simply, orchestrator) that supervises, controls, and/or otherwise administrates many different agents and tools. Orchestrators can include one or more machine learning models and can execute supervisory functions, such as routing inputs (e.g., queries, instruction sets, natural language inputs or other human-readable inputs, machine-readable inputs) to specific agents to accomplish a set of prescribed tasks (e.g., retrieval requests prescribed by the orchestrator to answer a query). As used herein, "machine learning" or "ML" may be used to refer to any suitable statistical form of artificial intelligence capable of being trained using machine learning techniques, including supervised, unsupervised, and semi-supervised learning techniques. Machine learning models can include some or all of the different types or modalities of models described herein (e.g., multimodal machine learning models, large language models, data models, statistical models, audio models, visual models, audiovisual models, etc.). For example, in certain embodiments, ML-based techniques may be implemented using an artificial neural network (ANN) (e.g., a deep neural network (DNN), a recurrent neural network (RNN), a recursive neural network, a feed-forward neural network). In contrast, "rules-based" methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" refers to a linear algebra vector that is an ordered n-dimensional list (e.g., a 300 dimensional list) of floating point values (e.g., a 1×N or an N×1 matrix) that provides a mathematical representation of the semantic meaning of a word or phrase, an intent, an entity, a token or an utterance. ML-based methods, perform well (e.g., better than rule-based methods) when a large corpus of data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Agents can include one or more multimodal models (e.g., large language models) to accomplish the prescribed tasks using a variety of different tools. Different agents can use various tools to execute and process unstructured data retrieval requests, structured data retrieval requests, application programming interface (API) calls (e.g., for accessing artificial intelligence application insights), and the like. Tools can include one or more specific functions and/or machine learning models to accomplish a given task (or set of tasks).

Agents can adapt to perform differently based on contexts. A context may relate to a particular domain (e.g., industry) and an agent may employ a particular model (e.g., large language model, other machine learning model, and/or data model) that has been trained on industry-specific datasets. Some or all of the models described herein may be trained for specific domains in addition to, or instead of, more general purposes. The specialized enterprise generative artificial intelligence architecture leverages domain specific models to produce accurate context specific retrieval and insights.

The orchestrator manages the agents to efficiently process disparate inputs or different portions of an input. For example, an input may require the system to access and retrieve data records from disparate data sources (e.g., unstructured datastores, structured datastores, timeseries datastores, and the like), database tables from different types of databases, and machine learning insights from different machine learning applications. The different agents can each separately, and in parallel, handle each of these requests, greatly increasing computational efficiency. Agents can process the disparate data returned by the different agents and/or tools. For example, large language models typically receive inputs in natural language format. The agents may receive information in a non-natural language format (e.g., database table, image, audio) from a tool and transform it into natural language describing the tool output in a format understood by large language models. A large language model can then process that input to "answer," or otherwise satisfy the initial input.

FIG. 3 depicts a diagram of the computer SaaIP system and method 100 of an exemplary logical flow of a specialized enterprise generative artificial intelligence system according to some embodiments. As shown, an initial input 302 is received by the SaaIP system and method 100 from either a user (e.g., a natural language input) or another system (e.g., a machine-readable input). An orchestrator agent (or, simply, orchestrator) can pre-process the input in step 304. Pre-processing can include, for example, acronym handling, translation handling, punctuation handling, input identification (e.g., identifying different portions of the input 302 for processing by different agents). The orchestrator can use a multimodal model (e.g., large language model) to further process the input 302 to create a plan for determining a result (step 312) for the input. The plan may include a prescribed set of tasks, such as structured data retrieval tasks, unstructured data retrieval tasks, timeseries processing tasks, visualization tasks, and the like. In some embodiments, the plan can designate which tools 308 should be used to execute the tasks, and the orchestrator can select the agents based on the designated tools. In some embodiments, the plan can designate which agents should be used to execute the tasks, and the agents can independently designate which tools 308 should be used to execute the tasks. The orchestrator routes the pre-processed input to agents 306 for further processing. More specifically, the orchestrator may use one or more multimodal models (e.g., language, video, audio, statistical models, etc.), and/or other machine learning models, to interpret the input 302 to select appropriate agents 306 and appropriate tools 308. For example, the orchestrator may determine that a first portion of the input requires a database query, while another portion of the input requires an application programming interface (API) call. The orchestrator can appropriately route the first portion of the input to the appropriate agent 306-1 (e.g., a structured data retrieval agent) and route the second portion of the input to another agent 306-2 (e.g., API agent). There could be any number of such agents 306 accessing any number of different tools 308. The orchestrator may also instruct the agents 306 to operate in parallel and/or serially.

The agents 306 can select the appropriate tools 308 to accomplish a set of prescribed tasks (e.g., tasks prescribed by the orchestrator). The tools 308 can make the appropriate function calls to retrieve disparate data records among other functions. As used herein, data records can include unstructured data records (e.g., documents and text data that is stored on a file system in a format such as PDF, DOCX, .MD, HTML, TXT, PPTX, image files, audio files, video files, application outputs, and the like), structured data records (e.g., database tables or other data records stored according to a data model or type system), timeseries data records (e.g., sensor data, artificial intelligence application insights), and/or other types of data records (e.g., access control lists). The agents 306 can transform the disparate data records into a common format (e.g., natural language format) that can be post-processed (step 310) by a large language model (e.g., the same or different large language model that performed the pre-processing). More specifically, post-processing can take tool outputs (and/or transformed tool outputs) and generate a final result (step 312) that satisfies the initial input. For example, the orchestrator may use one or more large language models to determine the result. If the orchestrator determines there is not enough information to satisfy the initial input, the orchestrator can iteratively repeat some or all of the above steps until a stopping condition is satisfied and/or there is enough information to generate a final result (step 312).

Figure 4:
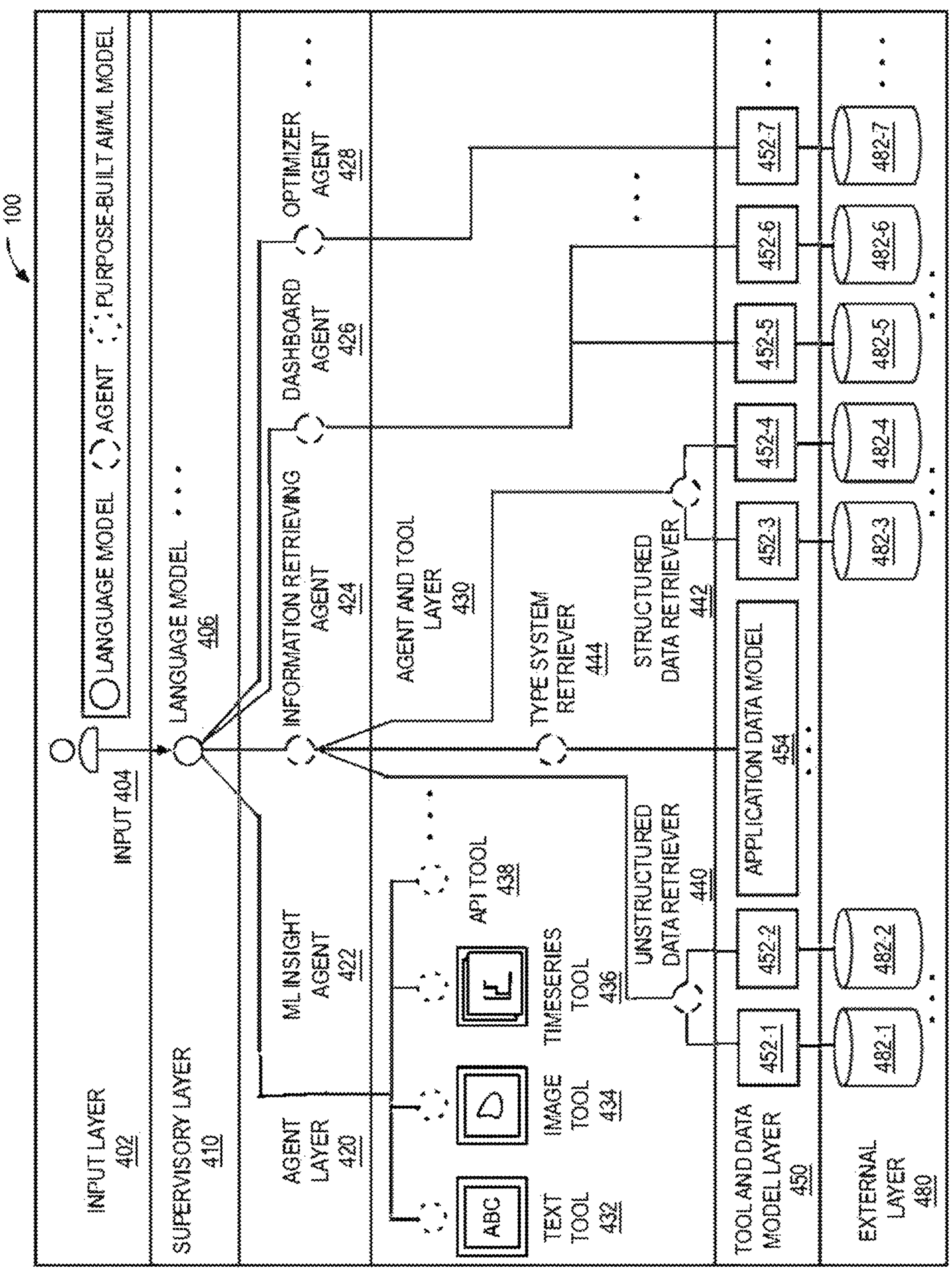
FIG. 4 depicts a diagram of an example layered architecture and environment of a generative artificial intelligence system according to some embodiments. Based on the user input, the supervisory layer may decide the route the SoftIP required resources. These resources may include structured and unstructured data, application data models, foundational models, and general purpose compute. Furthermore, the supervisory layer/agent, may decide to interact with other agents to perform the needs of SoftIP

FIG. 4 depicts a diagram of the computer SaaIP system and method 100 with an exemplary layered architecture and environment of a specialized enterprise generative artificial intelligence system according to some embodiments. Based on the user input, the supervisory layer may decide the route the SoftIP required resources. These resources may include structured and unstructured data, application data models, Foundational Models, General purpose compute. Furthermore, the supervisory layer/agent, may decide to interact with other agents to perform the needs of SoftIP. The specialized enterprise software computer SaaIP system and method 100 sits on top of a large language model (LLM) backbone, but not in the same way a traditional application uses a database. The LLM acts as an intelligent layer or "brain" that augments existing systems rather than replacing them entirely. This architecture is designed to add powerful natural language processing and generation capabilities to established enterprise processes and data. The specialized enterprise generative artificial intelligence system architecture and environment includes a hierarchy of layers. More specifically, the hierarchy of layers includes an input layer 402, a supervisory layer 410, an agent layer 420, an agent and tool layer 430, a tool and data model layer 450, and an external layer 460. It will be appreciated that these layers are shown by way of example, and other examples can include any number of such layers (e.g., any number of layers 420 and 430). The input layer 402 represents a layer of the enterprise generative artificial intelligence system architecture that receives an input (e.g., a query, complex input, instruction set, and/or the like) from a user or system. For example, an interface module of the enterprise generative artificial intelligence system may receive the input. The supervisory layer 410 represents a layer of the enterprise generative artificial intelligence system architecture that includes one or more large language models (e.g., of an orchestrator module) that can develop a plan for responding to the input received in the input layer 402. A plan can include a set of prescribed tasks (e.g., retrieval tasks, API call tasks, and the like). In one example, the supervisory layer 410 can provide pre-processing and post-processing functionality described herein as well as the functionality of the orchestrators and comprehension modules described herein. The supervisory layer 410 can coordinate with one or more of the subsequent layers 420-460 to execute the prescribed set of tasks. The agent layer 420 represents a layer of the enterprise generative artificial intelligence system architecture that includes agents that can execute the prescribed set of tasks. In the example of FIG. 4, the agent layer 420 includes a machine learning insight agent 422, an information retrieving agent 424, a dashboard agent 426, and an optimizer agent 428. Each of the agents 424-428 can include a large language model that provides reasoning functionality for accomplishing their assigned portion of the prescribed set of tasks. More specially, the agents 424-428 can instruct the agents and tools of subsequent layers (e.g., layer 430), of which there could be any number, to execute the tasks. For example, the machine learning insight agent 422 can instruct the text processing tool 432 to perform a text processing task (e.g., transform an artificial intelligence application output into natural language), an image processing tool 434 to perform an image processing task (e.g., generate a natural language summary of an image outputted from artificial intelligence application), a timeseries tool 436 to obtain summarize timeseries data (e.g., timeseries data output from an artificial intelligence application), and an API tool 438 to perform an API call task (e.g., execute an API call to trigger or access an artificial intelligence application).

The information retrieving agent 424 may cooperate with, and/or coordinate, several different agents to perform retrieval tasks. For example, the information retrieving agent 424 may instruct an unstructured data retriever agent 440 to receive unstructured data records, a structured data retriever agent 442 to retrieve structured data records, and a type system retriever agent 444 to obtain one or more data models (or subsets of data models) and/or types from a type system. The type system provides compatibility across different data formats, protocols, operating languages, disparate systems, etc. Types can encapsulate data formats for some or all of the different types or modalities described herein (e.g., multi-modal, text, coded, language, statistical, audio, visual, audiovisual, etc.). For example, a data model may include a variety of different types (e.g., in a tree or graph structure), and each of the types may describe data fields, operations, functions, and the like. Each type can represent a different object (e.g., a real-world object, such as a machine or sensor in a factory) or system (e.g., computing cluster, enterprise datastores, file systems), and each type can include a large language model context that provides context for the large language model to design or update a plan. For example, the context may include a natural language summary or description of the type (e.g., a description of the represented object, relationships with other types or objects, associated methods and functions, and the like). Types can be defined in a natural language format for efficient processing by large language models. The type system retriever agent 444 may traverse the data model 454 to retrieve a subset of the data model 454 and/or types of the data model 454. The structured data retriever agent 442 can then use that retrieved information to efficiently retrieve structured data from a structured data source (e.g., a structured data source that is structured or modeled according to the data model 454).

The dashboard agent 426 may be configured to generate one or more visualizations and/or graphical user interfaces, such as dashboards. For example, the dashboard agent 426 may execute tools 452-5 and 452-6 to generate dashboards based on information retrieved by the other agents and/or information output by the other agents (e.g., natural language summaries of associated tool outputs).

The optimizer agent 428 may be configured to execute a variety of different prescriptive analytics functions and mathematical optimizations 452-7 to assist in the calculation of answers for various problems. For example, the large language model 406 may use the optimizer agent 428 to generate plans, determine a set of prescribed tasks, determine whether more information is needed to generate a final result, and the like.

The tool and data model layer 450 is intended to represent a layer of the specialized enterprise generative artificial intelligence system architecture that includes tools 452 and the data model 454. The agents 440-442 can execute the tools 452 to retrieve information from various applications and datastores 482 in the external layer 460 (e.g., external relative to the specialized enterprise generative artificial intelligence system). The tools 452 may include connectors that can connect to systems and datastore that are external to the enterprise generative artificial intelligence system.

Figure 5:
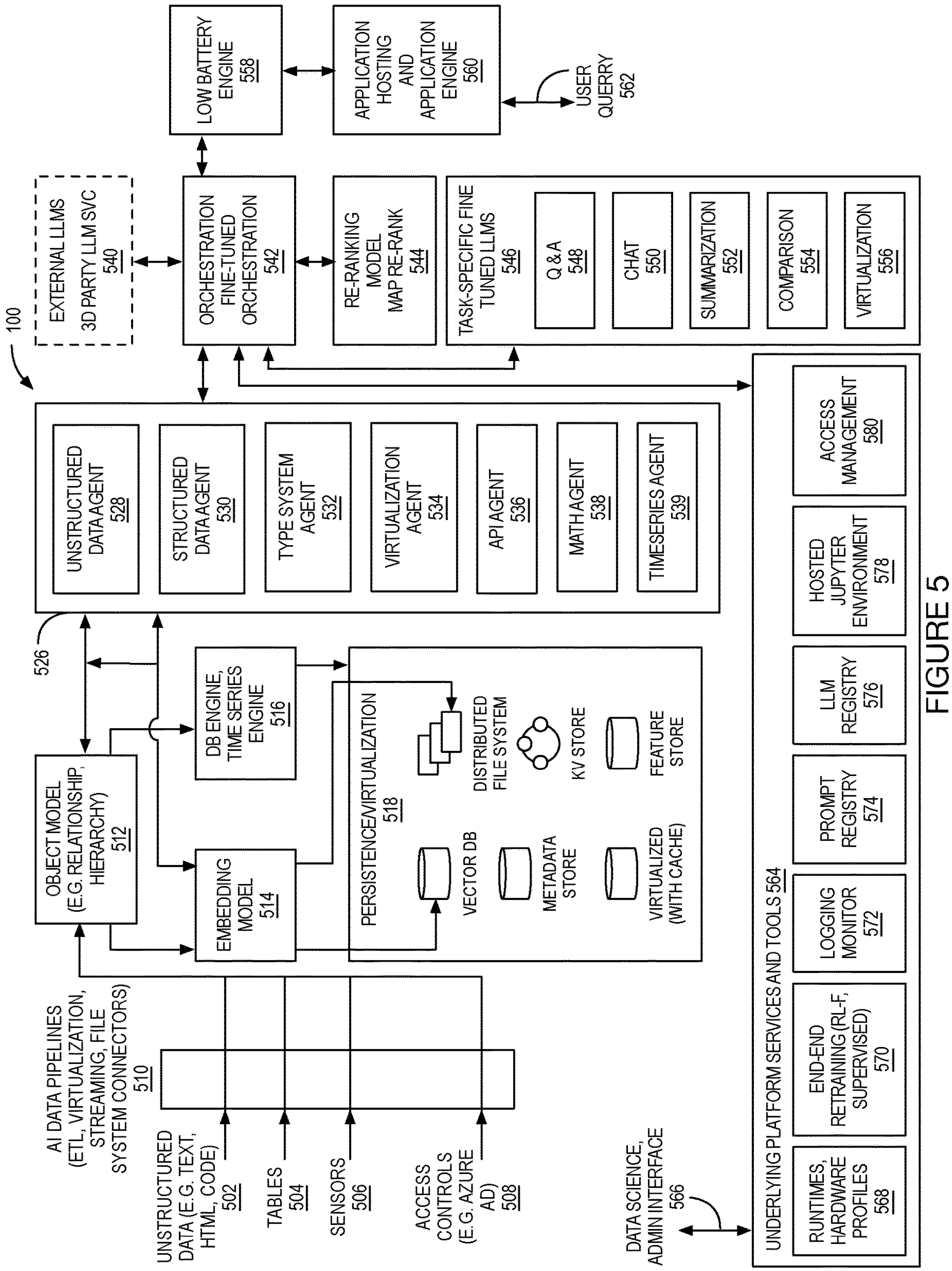
FIG. 5 depicts a diagram of the SaaIP system and method 100 with an architecture of a specialized enterprise generative artificial intelligence system according to some embodiments. This system and method 100 introduces a system management and orchestration to log events, keep inventory of data, and manage identity mapping.

FIG. 5 depicts a diagram of the SaaIP system and method 100 with an architecture of a specialized enterprise generative artificial intelligence system according to some embodiments. In the example of FIG. 5, the specialized enterprise generative artificial intelligence system can ingest disparate data, such as unstructured data 502, structured data (e.g., tables) 504, sensor data 506, and access control information 508. This system and method 100 introduces a system management and orchestration to log events, keep inventory of data, and manage identity mapping. The data may be received via one or more artificial intelligence data pipelines 510. Data may be ingested according to an object model (or, data model) 512, and an embedding model 514 may be used to generate embeddings from the ingested data and persisted and/or virtualized in various datastores 518. The datastores 518 can include vector datastores, metadata datastores, virtualized datastores, distributed file systems, key value datastores, and features stores (e.g., that stores embeddings as features for various models described herein). Database engines and timeseries engines 516 can also be used to persist and/or virtualize data within the datastores 518.

In FIG. 5, the specialized enterprise generative artificial intelligence system includes a variety of different agents 526-539. These are shown by way of example, and various embodiments may include different agents instead of, or in addition to, the agents 526-539. The specialized enterprise generative artificial intelligence system includes an orchestrator 542 with a fine-tuned large language model. The orchestrator 542 and/or agents 526-539 may include and/or access task-specific large language models 548-556, as well as external or third-party large language models 540 in some embodiments. The orchestrator 542 can utilize various underlying platform services tools, such as run-time hardware profiles 568, end-end retraining 560, logging and monitoring 562, prompt registry 574, model registry 576, hosted JUPYTER environment 578, access management controls 560, and/or the like.

In some embodiments, a user query 562 and/or other inputs may be received by an application hosting an application engine 560 which can communicate with a low latency engine 558 to provide the input, or a transformed input, to the orchestrator 542. The orchestrator 542 may utilize the various agents, large language models, and other features to generate an accurate and reliable (e.g., without hallucination) answer to the user query 562. In some embodiments, only a portion of the architecture depicted in FIG. 5 may be deployed in an external environment (e.g., a customer hosted environment or a customer cloud environment). For example, a portion of the architecture may be deployed in an external environment while some or all of the other portions remain in an internal environment (e.g., the internal hosted environment and/or associated cloud environment of the entity providing the enterprise generative artificial intelligence system).

Figure 6:
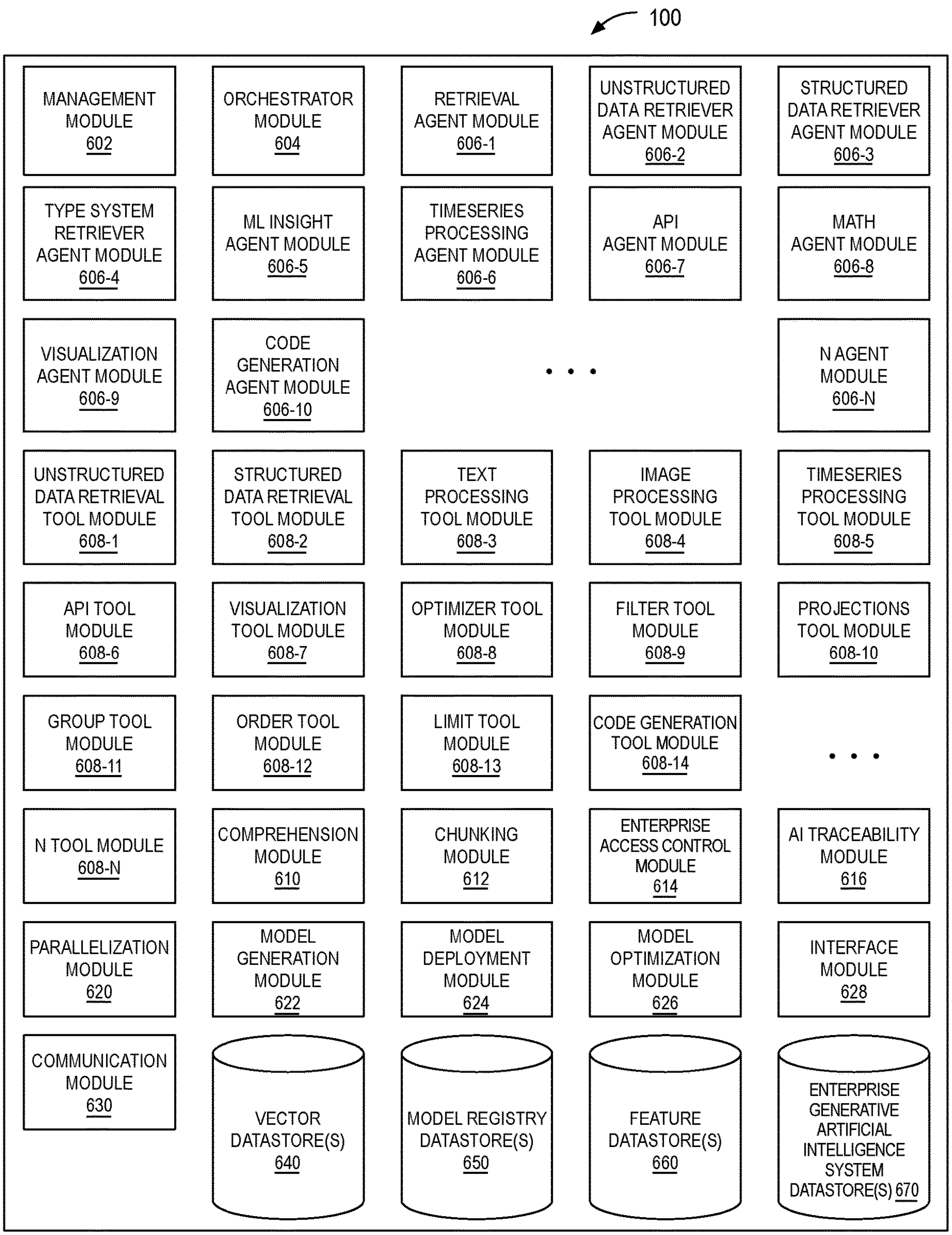
FIG. 6 depicts a diagram of the computer SaaIP system and method 100 as an exemplary specialized enterprise generative artificial intelligence system according to some embodiments. This system and method 100 orchestrates and organizes all specialized capabilities and function libraries that SoftIP vendors require to develop, test, and deploy SoftIP to production.

FIG. 6 depicts a diagram of the SaaIP system and method 100 as an exemplary specialized enterprise generative artificial intelligence system according to some embodiments. This system and method 100 orchestrates and organizes all specialized capabilities and function libraries that SoftIP vendors require to develop, test, and deploy SoftIP to production. In the example of FIG. 6, the specialized enterprise generative artificial intelligence SaaIP system and method 100 includes a management module 602, an orchestrator module 604, a retrieval agent module 606-1, an unstructured data retriever agent module, 606-2, a structured data retriever agent module 606-3, a type system retriever agent module 606-4, a machine learning insight module 606-5, a timeseries processing agent 606-6, an API agent module 606-7, a math agent module 606-8, a visualization agent module 606-9, a code generation agent module 606-10, an unstructured data retrieval tool 608-1, an structured data retrieval tool 608-2, a text processing tool module 608-3, an image processing tool module 608-4, a timeseries processing tool module 608-5, an API tool module 608-6, a visualization tool module 608-7, an optimizer tool module 608-8, a filter tool module 608-9, a projections tool module 608-10, a group tool module 608-11, an order tool module 608-12, a limit tool module 608-13, code generation tool module 608-14, a comprehension module 610, a chunking module 612, an enterprise access control module 614, an artificial intelligence traceability module 616, a parallelization module 620, model generation module 622, a model deployment module 624, a model optimization module 626, an interface module 628, a communication module 630, vector datastore(s) 640, model registry datastore(s) 650, feature datastore(s) 660, and enterprise generative artificial intelligence system datastore(s) 660. The management module 602 can function to (e.g., create, read, update, delete, or otherwise access) data associated with the enterprise generative artificial intelligence system 602. The management module 602 can store or otherwise manage or store in any of the datastores 640-660, and/or in one or more other local and/or remote datastores. It will be appreciated that that datastores can be a single datastore local to the enterprise generative artificial intelligence system 602 and/or multiple datastores remote to the enterprise generative artificial intelligence system 602. In some embodiments, the datastores described herein comprise one or more local and/or remote datastores. The management module 602 can perform operations manually (e.g., by a user interacting with a GUI) and/or automatically (e.g., triggered by one or more of the modules 604-630). Like other modules described herein, some or all the functionality of the management module 602 can be included in and/or cooperate with one or more other modules, systems, and/or datastores.

The orchestrator module 604 can function to generate and/or execute one or more orchestrator agents (or, simply, orchestrators). An orchestrator can orchestrate, supervise, and/or otherwise control agents 606. In some implementations, the orchestrator includes one or more large language models. The orchestrator can interpret inputs, select appropriate agents for handling queries and other inputs, and route the interpreted input to the selected agents. The orchestrator can also execute a variety of supervisory functions. For example, the orchestrator may implement stopping conditions to prevent the comprehension module from stalling in an endless loop during an iterative context-based generative artificial intelligence process. The orchestrator may also include one or more other types of models to process (e.g., transform) non-text input. Other models (e.g., other machine learning models, translation models) may also be included in addition to, or instead of, the large language models for some or all of the agents and/or modules described herein. In some embodiments, an orchestrator can process data received from a variety of data sources in different formats that can be processed with natural language processing (NLP) (e.g., with tokenization, stemming, lemmatization, normalization, and the like) with vectorized data and can generate pre-trained transformers that are fine-tuned or re-trained on specific data tailored for an associated data domain or data application (e.g., SaaS applications, legacy enterprise applications, artificial intelligence application). Further processing can include data modeling feature inspection and/or machine learning model simulations to select one or more appropriate analysis channels. Example data objects can include accounts, products, employees, suppliers, opportunities, contracts, locations, digital portals, geolocation manufacturers, supervisory control and data acquisition (SCADA) information, open manufacturing system (OMS) information, inventories, supply chains, bills of materials, transportation services, maintenance logs, and service logs. In some embodiments, the orchestrator module 604 can use a variety of components when needed to inventory or generate objects (e.g., components, functionality, data, and/or the like) using rich and descriptive metadata, to dynamically generate embeddings for developing knowledge across a wide range of data domains (e.g., documents, tabular data, insights derived from artificial intelligence applications, web content, or other data sources). In an example implementation, the orchestrator module 504 can leverage, for example, some or all of the components described herein. Accordingly, for example, the orchestrator module 604 can facilitate storage, transformation, and communication to facilitate processing and embedding data. In some implementations, the orchestrator module can create embeddings for multiple data types across multiple industry verticals and knowledge domains, and even specific enterprise knowledge. Knowledge may be modeled explicitly and/or learned by the orchestrator module 604, agents 606, and/or tools 608. In an example, the orchestrator module 604 (and/or chunking module 612, discussed below) generates embeddings that are translated or transformed for compatibility with the comprehension module 610.

In some embodiments, the orchestrator 604 can be configured to make different data domains operate or interface with the components of the enterprise generative artificial intelligence system 602. In one example, the orchestrator module 604 may embedded objects from specific data domains as well as across data domains, applications, data models, analytical by-products artificial intelligence predictions, and knowledge repositories to provide robust search functionality without requiring specialized programming for each different data domain or data source. For example, the orchestrator module 604 can create multiple embeddings for a single object (e.g., an object may be embedded in a domain-specific or application-specific context). In some embodiments, the chunking module 612 (discussed below) along with the orchestrator module 604 can curate the data domains for embedding objects of the data domains in the enterprise information systems and/or environments. In some embodiments, the orchestrator 604 can cooperate with the chunking module 612 to provide the embedding functionality described herein.

In some embodiments, the orchestrator module 604 can cause an agent 606 to perform data modeling to translate raw source data formats into target embeddings (e.g., objects, types, and/or the like). Data formats can include some or all of the different types or modalities described herein (e.g., multimodal, text, coded, language, statistical, audio, visual, audiovisual, etc.). In an example implementation, the orchestrator module 604 employs a type system of a model-driven architecture to perform data modeling to translate raw source data formats into target types. A knowledge base of the specialized enterprise generative artificial intelligence system and generative artificial intelligence models can create the ability to integrate or combine insights from different artificial intelligence applications. As discussed elsewhere herein, the enterprise generative artificial intelligence computer SaaIP system and method 100 can handle machine-readable inputs (e.g., compiled code, structured data, and/or other types of formats that can be processed by a computer) in addition to human-readable inputs. Inputs can also include complex inputs, such as inputs including "and," "or", inputs that include different types of information to satisfy the input (e.g., text documents, database tables, and artificial intelligence insights). The orchestrator 604 may break up these complex inputs (e.g., by using a large language model) to be handled by multiple agents 606 (e.g., in parallel). As discussed above, the orchestrator module 604 can function to execute and/or otherwise process various supervisory functions. In some implementations, the orchestrator module 604 may enforce conditions (e.g., stopping conditions, resource allocation, prioritization, and/or the like). For example, a stopping condition may indicate a maximum number of iterations (or, hops) that can be performed before the iterative process terminates. The stopping condition, and/or other features managed by the orchestrator module 604, may be included in large language model prompts and/or in the large language models of the orchestrator and/or comprehension module 610, discussed below. In some embodiments, the stopping conditions can ensure that the enterprise generative artificial intelligence computing SaaIP system and method 100 will not get stuck in an endless loop. This feature can also allow the enterprise generative artificial intelligence computing SaaIP system and method 100 the flexibility of having a different number of iterations for different inputs (e.g., as opposed to having a fixed number of hops). In another example, the orchestrator module 604 can perform resource allocation such as virtualization or load balancing based on computing conditions. In some implementations, the orchestrator module 604 and/or agents 606 include models that can convert (or, transform) an image, database table, and/or other non-text input, into text format (e.g., natural language).

In some embodiments, the orchestrator module 604 can function to cooperate with agents 606 (e.g., retrieval agent module 606-1, unstructured data retriever agent module 606-2, structured data retriever agent module 606-3) to iteratively and non-iteratively process inputs to determine output results or answers, determine context and rationales for informing subsequent iterations, and determine whether large language models (e.g., of the orchestrator 604 and/or comprehension module 610) require additional information to determine answers. For example, the orchestrator module 604 may receive a query and instruct agent 606-1 to retrieve associated information. The retrieval agent module 606-1 may then select unstructured data retriever agent module 606-2 and/or structured data retriever agent module 606-3 depending on whether the orchestrator module 604 wants to retrieve structured or unstructured data records. The appropriate agents 606 can the select the corresponding tools and provide the tool output to the orchestrator module 604 and/or comprehension module 610 for determining a final result. The orchestrator 604 may also select and swap models as needed. For example, the orchestrator 604 may change out models (e.g., data models, large language models, machine learning models) of the enterprise generative artificial intelligence system 602 at or during run-time in addition to before or after run-time. For example, the orchestrator 604, agents 606, and comprehension module 610 may use particular sets of machine learning models for one domain and other models for different domains. The orchestrator 604 may select and use the appropriate models for a given domain and/or input.

In some embodiments, the orchestrator 604 may combine (e.g., stitch) outputs/results from various agents to create a unified output. For example, one or more of the agent modules 606 may obtain/output a document (or segment(s) thereof) or related information (e.g., text summary or translation), another agent module 606 may obtain/output a database table, and the like. The orchestrator 604 may then use one or more machine learning models (e.g., a large language model and/or another machine learning model) to combine the outputs/results into a unified output (e.g., having a common data format, such as natural language).

In some implementations, the orchestrator 604 pre-processes inputs (e.g., initial inputs) prior to the input being sent to one or more agents 606 for processing. For example, the orchestrator 604 may transform a first portion of an input into a structured query language (SQL) query and send that to an unstructured data retriever agent module 606-2 agent, transform a second portion of the input into an API call and send that to an API agent module 606-7, and the like. In another example, such transformation functionality may be performed by the agents 606 instead of, or in addition to, the orchestrator 604.

The orchestrator module 604 can function to process, extract and/or transform different types of data (e.g., text, database tables, images, video, code, and/or the like). For example, the orchestrator module 604 may take in a database table as input and transform it into natural language describing the database table which can then be provided to the comprehension module 610, which can then process that transformed input to "answer," or otherwise satisfy a query. In some embodiments, a large language model may be used to process text, while another model may be used to convert (or, transform) an image, database table, and/or other non-text input, into text format (e.g., natural language).

It will be appreciated that, in some embodiments, the orchestrator module 604 can include some or all of the functionality of the comprehension module 610. For example, the comprehension module 610 may be a component of the orchestrator module 604. Similarly, in some embodiments, the comprehension module 610 may include some or all of the functionality of the orchestrator module 604. In the example of FIG. 6, the agent modules 606 include a variety of different example agent modules 606-1 to 606-N. It will be appreciated that these are shown by way of example, and various embodiments may include different agents instead of, or in addition to, the agents 606-1 to 606-N. In some embodiments, each of the agents 606 comprises hardware and/or software, and include one or more large language models, one or more other machine learning models, and/or functions, to provide reasoning functionality to accomplish a prescribed set of tasks. It will be appreciated that reference to an agent module may refer to the agent itself and/or the component that generates and/or executes the agent. In some embodiments, the orchestrator is a type of agent and may be referred to as an orchestrator agent. Accordingly, reference to orchestrator may refer to the orchestrator itself and/or the component that generates and/or executes the orchestrator. In some embodiments, agents 606 use models to determine a sequence of choices. The determined decision sequence can include comparing choices, summarizing multiple choices, and/or analyzing multiple choices to generate context information about the choices. The agents 606 may also check conflicts or similarities between choices. In various embodiments, some or all the agents 606 can process data having disparate data types and/or data formats. For example, the agent modules 606 may receive a database table or an image as input (e.g., received from a tool 608) and translate the table or image into natural language describing the table or image which can then be output for processing by other modules, models, and/or systems (e.g., the orchestrator module 604 and/or comprehension module 610). In one example, a large language model may be used to process text, while another model may be used to convert (or, transform) an image, database table, and/or other non-text input, into text format (e.g., natural language). The retrieval agent module 606-1 can function to retrieve structured and unstructured data records. In some embodiments, the retrieval agent module 606-1 can coordinate/instruct the unstructured data retriever agent module 606-2 to retrieve unstructured data records and coordinate/instruct the structured data retriever agent module 606-3 and the type system retriever agent 606-4 to retrieve structured data records. For example, the retrieval agent module 606-1 may cooperate with other agents 606 and tools 608 to generate SQL queries to query an SQL database. The unstructured data retriever agent module 606-2 can function to retrieve unstructured data records (e.g., from an unstructured datastore) and/or passages (or, segments) of those data records. Unstructured data records may include, for example, text data that is stored on a file system in a format such as PDF, DOCX, .MD, HTML, TXT, PPTX, and the like.

In some embodiments, the agent 606-2 can use embeddings (e.g., vectors stored in vector store 640) when retrieving information. For example, the agent 606-2 can use a similarity evaluation or search on the vector datastore 740 to find relevant data records based on k-nearest neighbor, where embeddings that are closer to each other are more likely relevant. In some embodiments, the unstructured data retriever agent module 506-2 implements a Read-Extract-Answer (REA) data retrieval process and/or a Read-Answer (RA) data retrieval process. More specifically, REA and RA can be appropriate when the computer system and needs 100 needs to process large amounts of data. For example, a query may identify many different data records and/or passages (e.g., hundreds or thousands of data records and passages). For simplicity, reference to data records may include data records and/or passages.

More specifically, the unstructured data retriever agent module 606-2 can determine whether each data record is relevant to answer the query and filter out the data records that are not relevant. For example, the agent 606-2 can calculate and assign relevance scores (e.g., using a machine learning relevance model) for each of the retrieved data records. The relevance score can be relative to the other retrieved data records. For example, the least relevant data record may be assigned a minimum value (e.g., 0) and the most relevant data record may be assigned a maximum value (e.g., 100). The unstructured data retriever agent module 606-2 may filter out documents that are relevant (or the documents that are not relevant). For example, the unstructured data retriever agent module 606-2 may filter out data records that have a relevance score below a configurable threshold value (e.g., 50). In some embodiments, the number of data records that the unstructured data retriever agent module 606-2 can retrieve for a particular input or query can be user or system defined, and also may be configurable. For example, a system may define that a maximum of 50 data records can be returned.

In some embodiments, a large language model (e.g., of the unstructured data retriever agent module 606-2) can identify key points of the relevant documents and passages, and then provide the key points to a large language model (e.g., a large language model of the orchestrator 604). The large language model can provide a summary which can be used to generate the query answer (e.g., the summary can be the query answer). This can, for example, allow the computer SaaIP system and method 100 to look at a wide diversity of concepts and documents (e.g., as opposed to an iterative process). In some embodiments, if the number of documents or passages is below a threshold value, the unstructured data retriever agent module 606-2 can skip the "extract" step (e.g., summarizing key points), and provide the passages directly to the large language model. This can be referred to as the RA process.

The structured data retriever agent module 606-3 can function to retrieve structured data records, and/or passages (or, segments) thereof, from various structured datastores. For example, structured data records can include tabular data persisted in a relational database, key value store, or external database and modeled or accessed with entity types (or, simply, types). Structured data records can include data records that are structured according to one or more data models (e.g., complex data models) and/or data records that can be retrieved based on the one or more data models. Structured data records can include data records stored in a structured datastore (e.g., a datastore structured according to one or more data models). In a specific implementations, data models may include a graph structure of objects or types, and the agents 606 and/or tools 608 can traverse the graph in different paths to identify relevant types of the data model (e.g., depending on the query and a plan to answer the query provided by the orchestrator module 604) and can combine multiple tables with complex joins (e.g., as opposed to simply passing a single data from and performing operations on that single table). The paths may be stored in a datastore (e.g., a vector datastore 640) for efficient retrieval.

In some embodiments, the structured data retriever agent module 606-3 can use a variety of different tools to retrieve structured data (e.g., structured data retrieval tool 608-2, filter tool 608-9, projections tool 608-10, group tool 608-11, order tool 608-12, limit tool 608-13, and the like). In some embodiments, once the structured data retriever agent module 606-3 has traversed the data model and retrieved the relevant type(s) and/or subsets of the data model, the structured data retriever agent module 606-3 can then use that information, along with the agent and/or tool outputs, to construct a structured query specification which it can execute against one or more structured datastores to retrieve the structured data records. The type system retriever agent module 606-4 can function to retrieve types, data models, and/or subsets of data models. For example, a data model may include a variety of different types, and each of the types may describe data fields, operations, and functions. Each type can represent a different object (e.g., a real-word object, such as a machine or sensor in a factor), and each type can include a large language model context that provides context for a large language model. Types can be defined in a natural language format for efficient processing by large language models.

The visualization agent module 606-9 can function to generate one or more visualizations and/or graphical user interfaces, such as dashboards, charts, and the like. For example, the visualization agent module 606-9 may execute visualization tool module 608-7 to generate dashboards based on information retrieved by the other agents and/or information output by the other agents (e.g., natural language summaries of associated tool outputs). The visualization agent module 606-9 may also function to generate summaries (e.g., natural language summaries) of visual elements, such as charts, tables, images, and the like.

The code generation agent module 606-10 can function to instruct the code generation tool module 608-14 to generate source code, machine code, and/or other computer code. For example, the code generation agent module 606-10 may be configured to determine what code is needed (e.g., to satisfy a query, create an application, and the like) and instruct the tool 608-14 to generate that code in a particular language or format.

In some embodiments, the tools 608 are specific functions that agents (e.g., agents 606, orchestrator module 604) can access or execute while attempting to accomplish prescribed task(s) (e.g., of a set of prescribed tasks of a plan determined by the orchestrator module 604). Tools 608 can include software and/or hardware. Tools 608 may also include one or more machine learning models, but they may also include functions without any machine learning model. In some embodiments, tools 608 do not include large language models, although in other embodiments tools may include large language models. In some embodiments, some or all of the agents 606 and/or tools 608 can be manually configured (e.g., by a user). Agents 606 and tools 608 may also normalize data (e.g., to a common data format) before outputting the data. The unstructured data retrieval tool 608-1 can function to retrieve unstructured data records from an unstructured data store. In some embodiments, the agent 606-2 can use embeddings (e.g., vectors stored in vector store 740) when retrieving information. For example, the agent 606-2 can use a similarity evaluation or search to find relevant data records based on k-nearest neighbor, where embeddings that are closer to each other are more likely relevant. The structured data retrieval tool 608-2 can function to access and retrieve structured data records from a structured datastore (e.g., structured or modeled according to a data model). The structured data retrieval tool 608-2 may be executed by the structured data retriever agent module 606-3). The text processing tool module 608-3 can function to retrieve and/or transform text (e.g., from unstructured data records) and perform other text processing tasks (e.g., transform a text-based output of artificial intelligence application into natural language). The image processing tool module 608-4 can function to perform an image processing task (e.g., generate a natural language summary of an image). The timeseries processing tool module 608-5 can function to obtain and/or process timeseries data (e.g., output from artificial intelligence applications, sensors, and the like). For example, the timeseries processing tool module 608-3 may be executed one or more of the agents 606 to obtain and process timeseries data. The API tool module 608-6 can function to perform an API call task (e.g., execute an API call to trigger or access an artificial intelligence application). For example, different agents 606 may use the API tool module 606-8 whenever the agent needs to access or trigger another application. The visualization tool module 608-7 can function to generate one or more visualizations and/or graphical user interfaces, such as dashboards. For example, the visualization tool module 508-7 may generate dashboards based on information retrieved by the other agents and/or information output by the other agents (e.g., natural language summaries of associated tool outputs). The filter tool module 608-9 can function to filter data records, types, and/or the like. For example, the filter tool module 608-9 may filter projections (e.g., fields) identified by the projections tool module 608-10 as part of a structured data retrieval process. In various embodiments, tools 608 can execute in parallel or otherwise.

In some embodiments, the filter tool module 608-9 can identify implicit filters based on a query or other input, and those identified implicit filters can be used as part of a structed data retrieval process. The filter tool module 608-9 may also identify contextual datetime filters. The filter tool module 608-9 may determine yesterday's date while accounting for time zone and other relevant data to generate an accurate filter. In some embodiments, the filter tool module 608-9 can validate identified filters prior to the filters being used (e.g., as part a structured data retrieval process). The projections tool module 608-10 can function to identify and select fields (e.g., type fields, object fields) that are relevant to determine an answer to a query or other input. The group tool module 608-11 can function to group data (e.g., types, tool outputs, and the like) which can then be used to generate structured query requests (e.g., by the structured data retriever agent module 606-3 and/or structured data retrieval tool module 608-2).

The order tool module 608-12 can function to order data (e.g., types, tool outputs, and the like) which can then be used to generate structured query requests (e.g., by the structured data retriever agent module 606-3 and/or structured data retrieval tool module 658-2). The limit tool module 608-13 can function to limit the output of a structured data retrieval process. For example, it may limit the number of retrieved data records, types, groups, filters, and or the like. The code generation tool module 608-14 can function to generate source code, machine code, and/or other computer code. For example, the code generation tool module 608-14 may be configured to generate and/or execute SQL queries, JAVA code, and/the like. The code generation tool module 608-14 may be used to facilities query generation for agents, other tools, large language models, and the like. The code generation tool module 608-15, in some embodiments, may be configured to generate source code for an application or create an application. The comprehension module 610 can function to process inputs to determine results (e.g., "answers"), determine rationales for results, and determine whether the comprehension module 610 needs more information to determine results. The comprehension module 610 may output information (e.g., results or additional queries) in a natural language format or machine language format. In some implementations, features of one or more models of the comprehension module define conditions or functions that determine if more information is needed to satisfy the initial input or if there is enough information to satisfy the initial input. In some embodiments, the comprehension module 610 includes one or more large language models. The large language models may be configured to generate and process context, as well as the other information described herein. The comprehension module 610 may also include other language models that pre-process inputs (e.g., a user query) prior to inputs being provided to the agents for handling. The comprehension module 610 may also include one or more large language models that process outputs from other models and modules (e.g., models of the agents 606). The comprehension module 610 may also include another large language model for processing answers from one large language model into a format more consistent with a final answer that can be transmitted to various users and/or systems (e.g., users or systems that provided the initial query or other intended recipient of the answer). For example, the comprehension module 610 may format answers according to various viewpoints. Viewpoints can be based on a type of user (e.g., human or machine), user roles (e.g., e.g., data scientist, engineer, director, and the like), access permissions, and the like. Accordingly, viewpoints enable the comprehension module 610 to generate and provide an answer specifically targeted for the recipient. The comprehension module 610 may also notify users and systems if it cannot find an answer (e.g., as opposed to presenting an answer that is likely faulty or biased).

In some implementations, features of one or more large language models of the comprehension module 610 define conditions or functions that determine if more information is needed to satisfy the initial input or if there is enough information to satisfy the initial input. The large language models of the comprehension module 610 may also define stopping conditions that indicate a stopping threshold condition indicating a maximum number of iterations that may be performed before the iterative process is terminated. In some embodiments, the comprehension module 610 can generate and store rationales and contexts (e.g., in datastore 670). The rationale may be the reasoning used by the comprehension module 610 to determine an output (e.g., natural language output, an indication that it needs more information, an indication that it can satisfy the initial input). The comprehension module 610 may generate context based on the rationale. In some implementations, the context comprises a concatenation and/or annotation of one or more segments of data records, and/or embeddings associated therewith, along with a mapping of the concatenations and/or annotations. For example, the mapping may indicate relationships between different segments, a weighted or relative value associated with the different segments, and/or the like. The rational and/or context may be included in the prompts that are provided to the large language models.

In some embodiments, the comprehension module 610 includes a query and rational generator that generates queries or other inputs for models (e.g., large language models, other machine learning models) and/or generates and stores the rationales and contexts (e.g., in the datastore 660). The query and rational generator can function to process, extract and/or transform different types of data (e.g., text, database tables, images, video, code, and/or the like). For example, the query and rational generator may take in a database table as input and transform it into natural language describing the database table which can then be provided to the one or more other models (e.g., large language models) of the comprehension module 610, which can then process that transformed input to "answer," or otherwise satisfy a query. In some implementations, the query and rational generator includes models that can convert (or, transform) an image, database table, and/or other non-text input, into text format (e.g., natural language). It will be appreciated that although queries are used in various examples throughout, other types of inputs (e.g., instruction sets) may be processed in the same or similar manner as described with respect to queries. In some embodiments, the comprehension module 610 can use different models for different domains. Accordingly, the comprehension module 610 can use particular models (e.g., data models and/or large language models) for a particular domain (e.g., a data model describing properties and relationships of aerospace objects and a large language model trained on aerospace-specific datasets) and use another data model and/or large language model for another domain (e.g., data model describing properties and relationships of defense-specific objects and a large language model trained on defense-specific datasets), and so forth. In some embodiments, the orchestrator module 604 includes some or all of the functionality and/or structure of the comprehension module 610 and/or 606, described further below. Similarly, in some embodiments, the comprehension module 610 may include some or all of the functionality and/or structure of the orchestrator module 604.

In some embodiments, the comprehension module 610 can function to generate large language model prompts (or, simply, prompts) and prompt templates. For example, the comprehension module 610 may generate a prompt template for processing an initial input, a prompt template for processing iterative inputs (i.e., inputs received during the iteration process after the initial input is processed), and another prompt template for the output result phase (i.e., when the comprehension module 610 has determined that it has enough information and/or a stopping condition is satisfied). The comprehension module 610 may modify the appropriate prompt template depending on a phase of the iterative process. For example, prompt templates can be modified to generate prompts that include rationales and contexts, which can inform subsequent iterations.

The chunking module 612 can function to process (e.g., chunk) a corpus of data records (e.g., of one or more enterprise systems) for handling by the enterprise generative artificial intelligence system 602. Data records, as used herein, may include any type of data record that may be stored in a datastore, such as unstructured data records and structured data records. For example, data records can include documents (e.g., PDF, text, html, markdown source code), database tables, information generated by application (e.g., artificial intelligence application insights), images, audiovisual files, executables, data records structured according to a data model and/or type system, and the like. More specifically, the chunking module 612 can pre-process and chunk the data records. The chunking process can partition data records and insert or append a respective header for each chunk. The header may include, for example, one or more attributes describing the chunk (e.g., type of data records, size of chunk, etc.). Chunks may be referred to as segments herein. Segments may include, for example, the header along with a passage of a text document, a portion of database table, and so forth. For simplicity, reference to a passage may include a segment and/or the content (e.g., text) of a segment. Segments can be stored in a segment datastore (e.g., vector store 740). A data record can be chunked into a tree structure where each leaf corresponds to a segment. Chunking can be rule-based.

In some implementations, pre-processing includes generating contextual information for data records and/or segments. The contextual information may improve security, as well as accuracy and reliability of associated retrieval operations. In one example, contextual information comprises contextual metadata. The contextual information can include references between segments and/or data records. For example, the references may indicate relationships that can be used (e.g., traversed) when performing similarity evaluations or other aspects of retrieval operations (e.g., by one or more of the agents 606). Contextual information may also include information that can assist a large language model in generating a plan and/or answers. For example, the chunking module 612 may generate contextual information for structured data chunks (or passages) that include natural language descriptions of the data records, locations of related data records, and the like.

The contextual information may include access controls. In some implementations, contextual information provides user-based access controls. More specifically, the contextual information can indicate user roles that may access a corresponding segment and/or data record, and/or user roles that may not access a corresponding segment and/or data record. The contextual information may be stored in headers of the data records and/or data record segments. In some embodiments, the chunking module 612 can generate embeddings based on both structured and unstructured data records and/or segments. The chunking module 612 may include a deep learning model that can convert and/or transform data records into a vector representation, where the vectors for semantically similar data records (e.g., the content of the data records) are close together in the vector space. This can facilitate retrieval operations by the agents 606 and tools 608. In some embodiments, the chunking module 612 can generate embeddings using one or more embeddings models. The embeddings may include a numerical representation for unstructured and/or structured data records that captures the semantic or contextual meaning of the data records. For example, the embeddings may be represented by one or more vectors. The embeddings may be used when retrieving data records and performing similarity evaluations or other aspects of retrieval operations. The embeddings may be stored in an embeddings index (e.g., vector datastore 640). In some embodiments, the vector store 640 is a type of database that is specifically optimized for storing embeddings and retrieving embeddings using a similarity heuristic (e.g., an approximate nearest neighbor (ANN) algorithm) that can be implemented by the agents 606 and/or tools 608.

In some implementations, the chunking module 612 generates enriched embeddings. For example, the chunking module 612 may generate enriched embeddings based on the contextual information, data records, and/or data record segments. An enriched embedding may comprise a vector value based on an embedding vector and the contextual information. In some embodiments, an enriched embedding comprises the embedding vector value along with the contextual metadata including the contextual information. Enriched embeddings may be indexed in an enriched embeddings datastore (e.g., a vector datastore 640). The agents 606 and/or tools 608 may retrieve unstructured and/or structured data records based on enriched embeddings.

In some embodiments, the chunking module 612 may perform some or all of the functionality described herein periodically (e.g., in batches), on-demand, and/or in real time. For example, the chunking module 612 may periodically trigger, on-demand trigger, manually trigger, and/or automatically trigger, the chunking described herein. In some implementations, subsequent chunking operations may only incorporate changes relative to previous chunking operations (e.g., the "delta").

In some embodiments, the chunking module 612 may generate contextual information for data records and/or segments. The contextual information may be represented by contextual metadata that provides access control (e.g., role-based access control) to associated data records and/or segments. The contextual information may maintain references between data records and/or data records segments. The chunking module 612 may insert and/or append contextual information in segment headers. The chunking module 612 may generate contextual information before, after, or at the same time as the associated embeddings are generated. For example, embeddings may be created using context information, or embeddings may be enriched with contextual information. The contextual information may be used by the chunking module 612 to map relationships between data records and/or segments of one or more enterprises or enterprise systems and store those relationships in a data model and/or datastore (e.g., datastore 760). As discussed elsewhere herein, the chunking module 612 can generate embeddings and/or enriched embeddings. In one example, the chunking module 612 implements a word2vec algorithm. In some implementations, the chunking module 612 utilizes models trained on domain-specific (or, industry-specific) datasets.

The enterprise access control module 614 can function to provide enterprise access controls (e.g., layers and/or protocols) for the enterprise generative artificial intelligence system 402, associated systems (e.g., enterprise systems), and/or environments (e.g., enterprise information environments). The enterprise access control module 614 can provide functionality for enforcement of access control policies with respect to generating results (e.g., preventing the orchestrator module 604 and/or comprehension module 610 from generating results that include sensitive information) and/or filtering results that have already been generated prior to providing a final result.

In some implementations, the enterprise access control module 614 may evaluate (e.g., using access control lists) whether a user is authorized to access all or only a portion of a result (e.g., answer). For example, a user can provide a query associated with a first department or sub-unit of an organization. Members of that department or sub-unit may be restricted from accessing certain pieces of data, types of data, data models, or other aspects of a data domain in which a search is to be performed. Where the initial results include data for which access by the user is restricted, the enterprise access control module 614 can determine how such restricted data is to be handled, such as to omit the restricted data entirely, omit the restricted data but indicate the results include data for which access by the user is restricted, or provide information related to all of the initial results. In the example where restricted data is omitted entirely, a final set of results may be returned for presentation to the user, where the final set of results does not inform the user that a portion of the initial results have been omitted. In the example where the restricted data is omitted but an indication of the presence of the restricted data is provided to the user, the final results may include only those results for which the user is authorized for access, but may include information indicating there were X number of initial results but only Y results are outputted, where Y<X. In the third example described above, all of the results may be outputted to the user, including results for which access is restricted by the user. Additionally, or alternatively, the enterprise access control module 614 may communicate with one or more other modules to obtain information that may be used to enforce access permissions/restrictions in connection with performing retrieval operations instead of for controlling presentation of the results to the user. For example, enterprise access control module 614 may restrict the data sources to which retrieval operations are applied, such as to not apply a retrieval operation to portions of the data sources for which user access is denied and apply the retrieval operations to portions of the data sources for which user access is permitted. It is noted that the exemplary techniques described above for enforcing access restrictions have been provided for purposes of illustration, rather than by way of limitation and it should be understood that modules operating in accordance with embodiments of the present disclosure may implement other techniques to present results via an interface based on access restrictions.

In some embodiments, to facilitate the enforcement of access restrictions in connection with searches performed by the enterprise generative artificial intelligence computing system and method 100, the enterprise access control module 614 may store information associated with access restrictions or permissions for each user. To retrieve the relevant restriction data for a user, the enterprise access control module 614 may receive information identifying the user in connection with the input or upon the user logging into system on which the enterprise access control module 614 is executing. The enterprise access control module 614 may use the information identifying the user to retrieve appropriate restriction data for supporting enforcement of access restrictions in connection with an enterprise search. In some embodiments, the enterprise access control module 614 can include credential management functionality of a model driven architecture in which the enterprise generative artificial intelligence system 402 is deployed or may be a remote credential management system communicatively coupled to the enterprise generative artificial intelligence system 402 via a network.

The artificial intelligence traceability module 616 can function to provide traceability and/or explainability of answers generated by the enterprise generative artificial intelligence computing SaaIP system and method 100. For example, the artificial intelligence traceability module 616 can indicate portions of data records used to generate the answers and their respect data sources. The artificial intelligence traceability module 616 can also function to corroborate large language model outputs. For example, the artificial intelligence traceability module 616 can provide sources citations automatically and/or on-demand to corroborate or validate large language model outputs. The artificial intelligence traceability module 616 may also determine a compatibility of the different sources (e.g., data records, passages) that were used to generate a large language model output. For example, the artificial intelligence traceability module 616 may identify data records that contradict each other (e.g., one of the data records indicate that John Doe is an employee at Acme corporation and another data record indicates that John Doe works at a different company) and provide a notification that the output was generated based on contradictory on conflicting information.

The parallelization module 620 can function to control the parallelization of the various systems, modules, agents, models, and processes described herein. For example, the parallelization module 620 may spawn parallel executions of different agents and/or orchestrators. The parallelization module 620 may be controlled by the orchestrator module 604. The model generation module 622 can function to obtain, generate, and/or modify some or all of the different types of models described herein (e.g., machine learning models, large language models, data models). In some implementations, the model generation module 622 can use a variety of machine learning techniques or algorithms to generate models. As used herein, artificial intelligence and/or machine learning can include Bayesian algorithms and/or models, deep learning algorithms and/or models (e.g., artificial neural networks, convolutional neural networks), gap analysis algorithms and/or models, supervised learning techniques and/or models, unsupervised learning algorithms and/or models, semi-supervised learning techniques and/or models random forest algorithms and/or models, similarity learning and/or distance algorithms, generative artificial intelligence algorithms and models, clustering algorithms and/or models, transformer-based algorithms and/or models, neural network transformer-based machine learning algorithms and/or models, reinforcement learning algorithms and/or models, and/or the like. The algorithms may be used to generate the corresponding models. For example, the algorithms may be executed on datasets (e.g., domain-specific data sets, enterprise datasets) to generate and/or output the corresponding models.

In some embodiments, a large language model is a deep learning model (e.g., generated by a deep learning algorithm) that can recognize, summarize, translate, predict, and/or generate text and other content based on knowledge gained from massive datasets. Large language models may comprise transformer-based models. Large language models can include Google's BERT, OpenAI's GPT-3, and Microsoft's Transformer. Large language models can process vast amounts of data, leading to improved accuracy in prediction and classification tasks. The large language models can use this information to learn patterns and relationships, which can help them make improved predictions and groupings relative to other machine learning models. Large language models can include artificial neural network transformers that are pre-trained using supervised and/or semi-supervised learning techniques. In some embodiments, large language models comprise deep learning models specialized in text generation. Large language models, in some embodiments, may be characterized by a significant number of parameters (e.g., in the tens or hundreds of billions of parameters) and the large corpuses of text used to train them.

Although the systems and processes described herein use large language models, it will be appreciated that other embodiments may use different types of machine learning models instead of, or in addition to, large language models. For example, an orchestrator 604 may use deep learning models specifically designed to receive non-natural language inputs (e.g., images, video, audio) and provide natural language outputs (e.g., summaries) and/or other types of output (e.g., a video summary).

The model deployment module 624 can function to deploy some or all of the different types of models described herein. In some implementations, the model deployment module 624 can deploy models before or after a deployment of enterprise generative artificial intelligence system. For example, the model deployment module 524 may cooperate with the model optimization module 626 to swap or other change large language models of an enterprise generative artificial intelligence system. In some implementations, a model registry 650 can store various models (e.g., machine learning models, large language models, data models) and/or model configurations. The models may be trained on generic datasets and/or domain-specific datasets. For example, the model registry may store different configurations of various large language models (e.g., which can be deployed or swapped in an enterprise generative artificial intelligence system 402). In some embodiments, each of the models may be associated with an embedding value, or enriched embedding value, to facilitate retrieval operations (e.g., in the same or similar manner as data records retrievals).

The model optimization module 626 can function to enable tuning and learning by the modules (e.g., the comprehension module 612) and/or the models (e.g., machine learning models, large language models) described herein. For example, the model optimization module 626 may tune the comprehension module 610 and/or orchestrator module 604 (and/or models thereof) based on tracking user interactions within systems, capturing explicit feedback (e.g., through a training user interface), implicit feedback, and/or the like. In some example implementations, the model optimization module 626 can use reinforcement learning to accelerate knowledge base bootstrapping. Reinforcement learning can be used for explicit bootstrapping of various systems (e.g., the enterprise generative artificial intelligence computing SaaIP system and method 100) with instrumentation of time spent, results clicked on, and/or the like. Example aspects of the model optimization module 626 include an innovative learning framework that can bootstrap models for different enterprise environments.

In some embodiments, the model optimization module 626 can retrain models (e.g., transformer-based natural language machine learning models) periodically, on-demand, and/or in real-time. In some example implementations, corresponding candidate model (e.g., candidate transformer-based natural language machine learning models) can be trained based on the user selections and the model optimization module 626 can replace some or all of the models with one or more candidate models that have been trained on the received user selections. It is noted that the described functionality has been provided by way of non-limiting example and other techniques may be used to generate queries and commands. For example, in additional or alternative implementations using multimodal or generative pre-trained transformers, which is an autoregressive language model that uses deep learning to produce human-like text, may be used to generate a query from the search input (i.e., without use of a seed bank). Input is subjected to embedding and vectorization, with a large language model is used for query generation the entity matched search input may be provided to the generative multimodal or large language model algorithm to generate the query. In such an implementation, a generative multimodal algorithm may be provided with contextual information, such as a schema of metadata defining table headers, field descriptions, and joining keys, which may be used to retrieve the search results. For example, the schema may be used to translate the entity matched search input into a query (e.g., an SQL query).

The communication module 630 can function to send requests, transmit and receive communications, and/or otherwise provide communication with one or more of the systems, modules, engines, layers, devices, datastores, and/or other components described herein. In a specific implementation, the communication module 630 may function to encrypt and decrypt communications. The communication module 630 may function to send requests to and receive data from one or more systems through a network or a portion of a network (e.g., communication network 218). In a specific implementation, the communication module 630 may send requests and receive data through a connection, all or a portion of which can be a wireless connection. The communication module 630 may request and receive messages, and/or other communications from associated systems, modules, layers, and/or the like. Communications may be stored in the enterprise generative artificial intelligence system datastore 660.

Enterprise demand for software and services of all types is exploding. Companies of all sizes have been collecting large amount of very valuable proprietary and public domain data (contextual and numeric). It is paramount to build competitive differentiation with these precious data using artificial intelligence (AI) and machine learning techniques to analyze, optimize, forecast, detect frauds, and offer competitive products. The existing solutions include licensed 3rd party software applications, Software-as-a-Service (SaaS) applications, and in-house software applications do not provide differentiating capabilities to the enterprise by tapping into a large pool of independent software vendors (ISV) while protecting enterprise's proprietary digital assets (such as data) and ISV's developed intellectual property. This disclosure offers a novel end-to-end system architecture to enable companies to create differentiating capabilities rapidly by tapping into a large pool of independent software vendors (ISV) while protecting enterprise's proprietary digital assets (such as data) and ISV's developed intellectual property. This system architecture may be referred to as Software-as-an-Intellectual Property (SaaIP).

Enterprise demand for software and services of all types is exploding. Companies of all sizes have been collecting large amount of very valuable proprietary and public domain data (contextual and numeric). It is paramount to build competitive differentiation with these precious data using artificial intelligence and machine learning techniques to analyze, optimize, forecast, detect frauds, and offer competitive products.

Currently, there are three main types of software solutions.

First, there is licensed third party software applications. These software applications are intellectual property of a vendor and licensed to the client. While clients may request features, it is up to the vendor to address such requests. When (and if) the vendor develops such features, the vendor will make these features available to all clients diminishing competitive differentiation of its clients.

Second, there are software-as-a-service (SaaS) applications. These software applications are intellectual property of a vendor and rented to the enterprise client from a cloud service. While this type of software is easier to manage for the enterprise since they are hosted on the vendor's cloud infrastructure, it carries the same challenges for the enterprise. If client-requested features are developed, they may be all shared with all vendors' clients again diminishing competitive differentiation of clients.

Third, there are In-house software applications. These software applications are developed and maintained by the client itself. While clients in this case own the intellectual property of the software, they must budget huge cost of development and maintenance of the software. In addition, these kinds of solutions tend to address very niche problems the client faces and usually the solutions built this way tend to be limited to imagination of a limited team.

None of these models allow independent software vendors (ISVs) to securely distribute and monetize proprietary software while maintaining control over intellectual property, nor do they provide enterprises with auditable, tamper-proof assurances regarding third-party code execution within sensitive environments.

The Software-As-An-Intellectual-Property (SaaIP) system and method 100 disclosed herein addresses significant shortcomings in conventional software licensing, deployment, and execution models by introducing a Software-As-An-Intellectual-Property (SaaIP) framework that enables secure, controlled, and auditable use of third-party software in enterprise environments. Unlike traditional software licensing models, which lack robust safeguards for protecting intellectual property and controlling code execution environments, the SaaIP system and method 100 delivers several distinct technical effects detailed below.

Figure 7A:
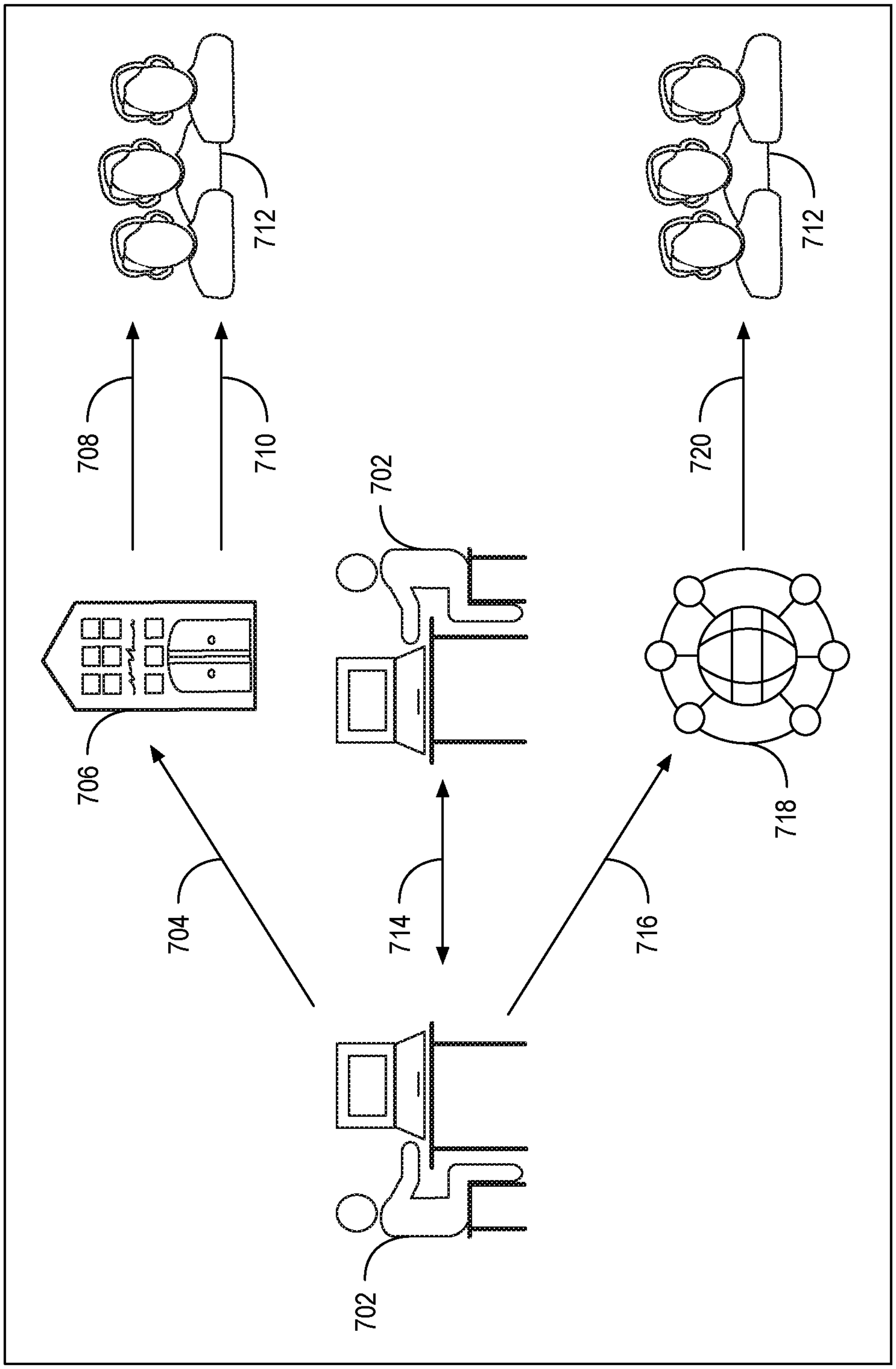
FIG. 7A illustrates a Software Intellectual-Property (SoftIP) license transfer model.

FIG. 7A illustrates the SaaIP system and method 100 as a Software Intellectual-Property (SoftIP) license transfer model that runs on the architecture discussed in relation to FIGS. 1-6. The SaaIP system and method 100 disclosed herein offers an end-to-end system architecture to enable companies to create differentiating capabilities rapidly by tapping into a large pool of independent software vendors (ISV) while protecting the enterprise's proprietary digital assets (e.g., data) and ISV's developed intellectual property. The SoftIP Developer 702 is able to list to monetize 704 at a SoftIP store 706. The SoftIP store 706 allows for SoftIP purchasing (i.e., SoftIP transfer) 708 or SoftIP output licensing (i.e., only results sent) 710 to a SoftIP Client 712. The SoftIP Developer 702 can collaborate 714 with another software developer 702. The SoftIP Developer 702 can conduct SoftIP peer-to-peer transfer 716 through a blockchain and cryptocurrency network 718 and then transfer 720 to a SoftIP client 712. The blockchain and cryptocurrency network 718 can be blockchain-based license and execution ledger so that all license transfers, software revision records, and execution logs are recorded immutably on a distributed blockchain ledger, providing tamper-proof, verifiable audit trails. The SoftIP developers 702 may monetize their SoftIP through the specialized SoftIP Store 706 or through a specificized blockchain and cryptocurrency network 718 that can keep track of identities, required resources and data, and software revisions.

Figure 7B:
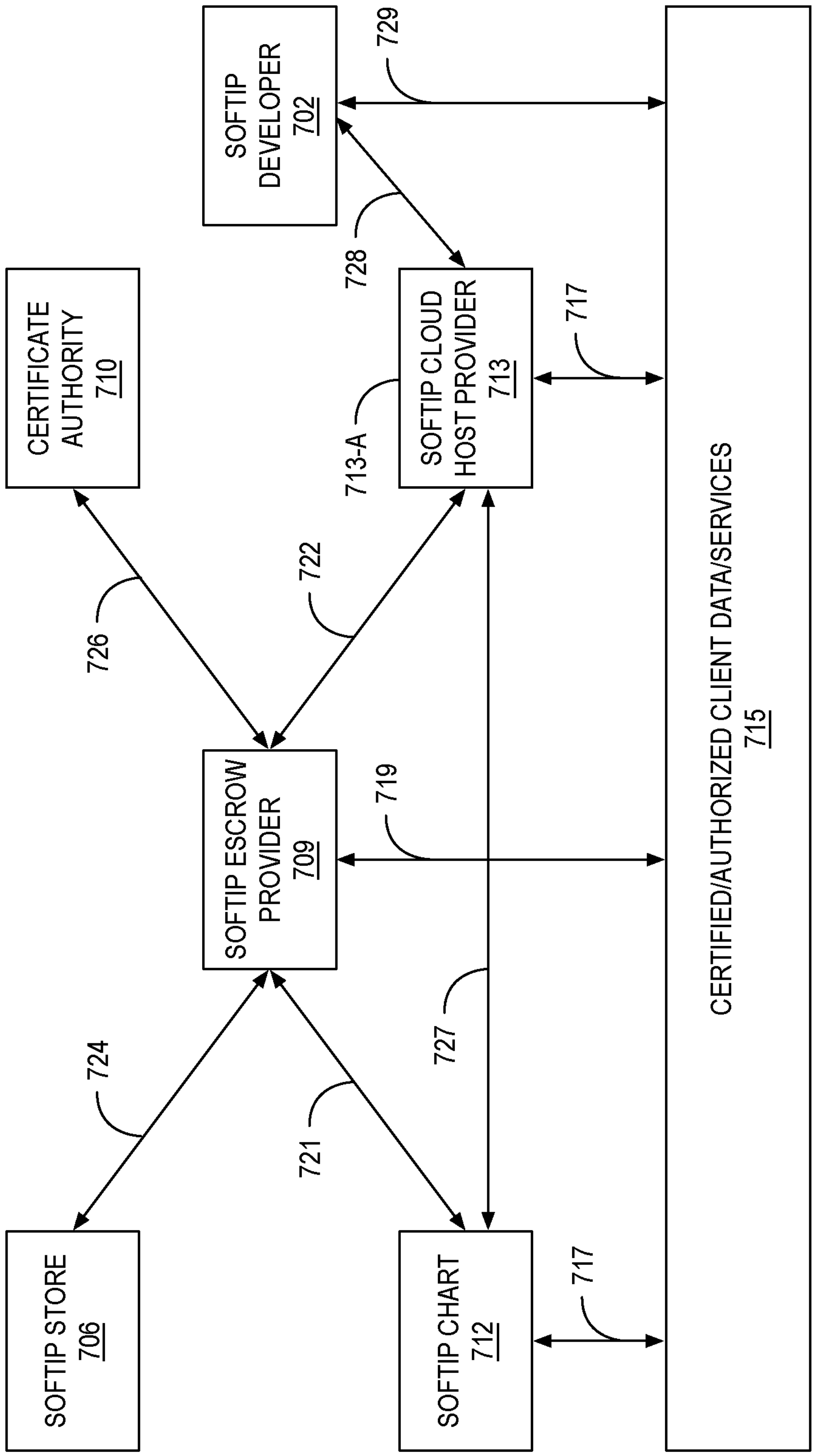
FIG. 7B is the corresponding SoftIP architecture.

FIG. 7B shows a block diagram illustrating physical components (e.g., hardware) of the SaaIP system and method 100 with which aspects of the disclosure may be practiced (which may be generated through the interaction of the components described in FIG. 1). The architectural elements of the SaaIP system and method 100 are as follows. SoftIP Client 712 is the end user and consumer of the software. The SoftIP Developer 702 is the independent software vendor and reference 706 is the SoftIP Store 706. SoftIP Escrow Provider 709 enables the SoftIP codes to be recorded for verification purposes and tamper avoidance. The SoftIP codes are software developed by independent software vendor. Certificate Authority 710 is a trusted third party organization that verifies the identity of the SoftIP Developers 702, SoftIP Clients 712, and the Cloud Host Provider 713. The Certificate Authority 710 issues digital certificate to these entities. The CA 710 is involved to validate the SoftIP Developer's 702 organization as well as signing the initial code commit using its own private key. SoftIP Developer 702 may then use the certificates signed by the CA to demonstrate validity of its organization to the SoftIP Clients 712 and provide strict tamp-resistant SoftIP with option to evolve the SoftIP by approval of the SoftIP Client 712. The SoftIP Developer 702 may also use its own public key to sign codes, encrypt, and perform authentication with SoftIP Escrow Provider 709, SoftIP Store 706, SoftIP Client 712, and SoftIP Cloud Host Provider 713.

SoftIP Cloud Host Provider 713 is the entity that may execute the SoftIP code and allocates the mandatory resources and required data as specified by the SoftIP Developer 702. SoftIP Cloud Host Provider 713 is also responsible to control access to resources/data and verify the code integrity and flawless execution. SoftIP Cloud Host Provider 713 provides controlled and verifiable software development environment (certified tools, certified data application programming interface ( ) and other services). This secure execution environment means that third-party code (SoftIP Code) 713A executes within sandboxed environments controlled by the SoftIP Cloud Host Provider 713. Sandboxing is the practice of isolating a piece of software so that it can access only certain resources, programs, and files within system and method 100, so as to reduce the risk of errors or malware affecting the rest of the system and method 100. The SoftIP Cloud Host Provider 713 verifies code 713A integrity, limits resource access using standardized identifiers (MURIs, MUDIs), and restricts execution to authorized APIs and certified datasets. The SaaIP system and method 100 features controlled and verified execution in a secure environment. The SoftIP Cloud Host Provider 713 executes third-party software only after verifying its identity, version, and resource access parameters using cryptographic methods. Execution occurs in a sandboxed environment with certified APIs, ensuring that third-party code cannot access sensitive enterprise resources beyond what is explicitly authorized. This technical framework delivers a technological improvement in access control and software execution reliability, addressing a recognized challenge in secure cloud-hosted software services.

Reference 715 refers to the Certified/Authorized Client Data/Services (CACDS). The CACDS 715 is involved to validate the SoftIP Developer's 702 organization as well as signing the initial code commit using its own private key. SoftIP Developer 702 may then use the certificates signed by the CACDS 715 to demonstrate validity of its organization to the SoftIP Clients 712 and provide strict tamper-resistant SoftIP with option to evolve the SoftIP by approval of the SoftIP Client 712. The SoftIP Developer 702 may also use its own public key to sign codes, encrypt, and perform authentication with SoftIP Escrow Provider 709, SoftIP Store 706, SoftIP Client 712, and SoftIP Cloud Host Provider 713. References 717 are authorized API data interfaces. Reference 719 is a data health and integrity check control interface. Reference 721 is a code integrity verification control interface. Reference 722 indicates code escrow and integrity verification control interface. Reference 724 is a software publication and download control interface. Reference 726 is a certificate management and verification control interface. Reference 728 is a unified developer indirect data interface. Reference 729 is a unified developer direct data interface. Reference 727 is a SoftIP and live signal transfer interface. Code upgrades are version-controlled, cryptographically validated, and require escrow confirmation before deployment to production environments, preventing automatic unverified code propagation.

Figure 7C:
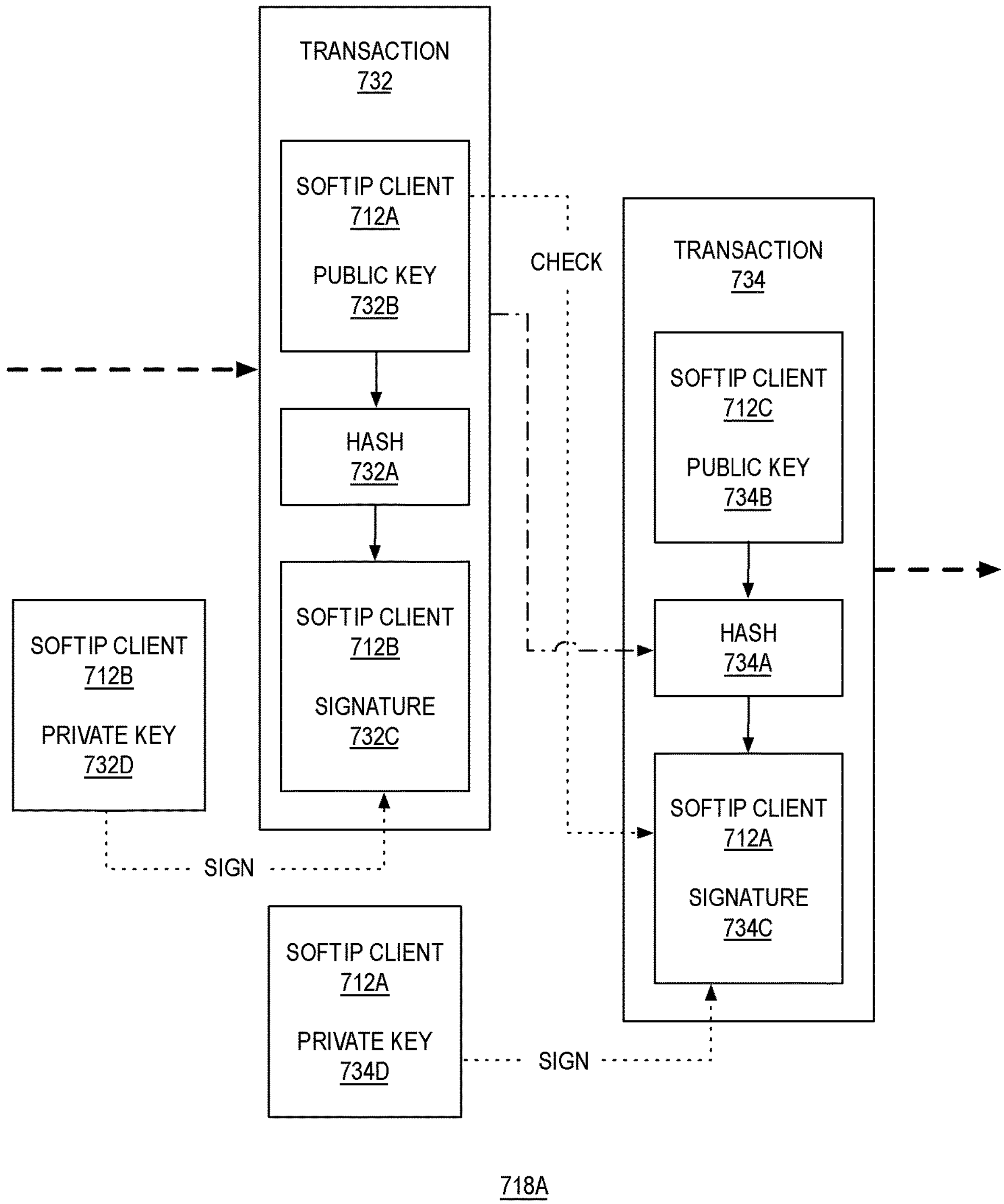
FIG. 7C is a schematic diagram illustrating a blockchain and cryptocurrency network.

FIG. 7C is a schematic diagram illustrating the blockchain ledger 718A of a blockchain and cryptocurrency network 718 (which may be generated through the interaction of the components of FIG. 1). The SaaIP system and method 100 has immutable auditability via blockchain and cryptocurrency network 718. The SaaIP system and method 100 incorporates a blockchain-based ledger 718A to record all SoftIP license transfers, code revisions, and execution events in an immutable, tamper-resistant manner. By decentralizing this record-keeping process, the SaaIP system and method 100 guarantees that all stakeholders—SoftIP Developers 702, SoftIP Clients 712, and SoftIP Cloud Host Providers 713—can independently verify the provenance, status, and execution history of any software package. This represents a significant advancement in software licensing transparency and auditability, compared to centralized or manual tracking method. A SoftIP Developer 702 may be associated with a device that executes a stored software application (e.g., a wallet application) capable of obtaining the blockchain ledger 718A from one or more networked computer systems (e.g., one of peer systems configured to "mine" broadcasted transaction data and update blockchain ledgers 718A). The blockchain and cryptocurrency network 718 may represent a blockchain ledger 718A made up of a number of discrete "blocks," which may identify transactions that transfer, distribute, etc., portions of tracked proprietary digital assets among various owners (e.g., SoftIP Developers 702, SoftIP Clients 712). For example, a SoftIP Client 712A may obtain the current blockchain ledger 718A, and may process the blockchain ledger 718A to determine that a prior owner transferred ownership of a portion of the tracked proprietary digital assets to another SoftIP Client 712B in a corresponding transaction (e.g., transaction 732, schematically illustrated in FIG. 7C). As described above, one or more of peer systems may have previously data verified, processed, and packed associated with transaction 732 may be into a corresponding block of the blockchain ledger 718A. In some aspects, transaction 732 may include a proprietary digital asset that references one or more prior transactions (e.g., transactions that transferred ownership of the tracked proprietary digital asset portion to another SoftIP Client 712B), and further, output data that includes instructions for transferring the tracked proprietary digital asset portion to one or more additional owners (e.g., another SoftIP Client 712B). For example, input data consistent with the disclosed embodiments may include, but is not limited to, a cryptographic hash of the one or more prior transactions (e.g., hash 732A) and the set of rules and triggers associated with the assets while the output data consistent with the disclosed embodiments may include, but is not limited to, a quantity or number of units of the tracked proprietary digital asset portion that are subject to transfer in transaction 732 and a public key of the recipient (e.g., public key 732B of SoftIP Client 712A). Further, in some aspects, the transaction proprietary digital asset data may include a digital signature 732C of the prior owner, which may be applied to hash 732A and public key 732B using a private key 732D of a SoftIP Client 712B through any of a number of techniques apparent to one of skill in the art and appropriate to the blockchain ledger 718A architecture. By way of example, the presence of SoftIP Client 712B's public key within transaction proprietary digital asset data included within the blockchain ledger 718A may enable a SoftIP Client 712A and/or peer systems to verify a Soft IP Client 712B's digital signature, as applied to proprietary digital data associated with transaction 732. A SoftIP Client 712A device may execute one or more software applications (e.g., wallet applications) that generate input and output data specifying a transaction (e.g., transaction 204 of FIG. 7B) that transfers ownership of the tracked SoftIP asset portion from a SoftIP Client 712A to another client, and further, that transmit the generated data to one or more of peer systems for verification, processing (e.g., additional cryptographic hashing) and inclusion into a new block of the blockchain ledger 718A. For example, data specifying transaction 734 may include, but is not limited to, a cryptographic hash 734A of prior transaction 732, a quantity or number of units of the tracked asset portion that are subject to transfer in transaction 734, and a public key of the recipient (e.g., public key 734B). Further, in some aspects, the data specifying transaction 734 may include a digital signature 734C of the SoftIP Client 712A, which may be applied to hash 734A and public key 734B using a private key 734D of SoftIP Client 712A using any of the exemplary techniques described above. Further, and by way of example, the presence of SoftIP Client 712A's public key 732B within transaction data included within the blockchain ledger 718A may enable various devices and systems to verify SoftIP Client 712A's digital signature 734C, as applied to data specifying transaction 734. As described above, one or more of peer systems may receive the data specifying transaction 734 from a SoftIP Client 712C device. In certain instances, peer systems may act as "miners" for the blockchain ledger 718A, and may competitively process the received transaction proprietary digital data to generate additional blocks of the ledger 718A, which may be appended to the blockchain ledger 718A and distributed across peer systems (e.g., through a peer-to-peer network) and to other connected devices of system and method 100.

The SaaIP system and method 100 produces specific, concrete, and repeatable technical effects including: enhanced software package security via cryptographic code verification using a blockchain and cryptocurrency network 718; controlled, sandboxed execution of third-party code 713A using certified APIs; immutable, distributed ledger 718A for license and revision tracking; fine-grained resource and data access control using standardized identifiers; and verified developer identity and software provenance via certificate authorities 715. Collectively, these improvements provide a technical solution to the technical problem of safely and verifiably deploying third-party software within enterprise environments—solutions that are deeply rooted in computer technology.

The SaaIP system and method 100 is tamper-proof software distribution and execution. The SaaIP system and method 100 leverages cryptographic certificates, hash verification, and code escrow mechanisms to prevent code tampering during submission, revision, and execution processes. Each software package and its revisions are cryptographically signed and verified both at submission and prior to execution, ensuring code integrity and preventing unauthorized modifications. This provides a concrete improvement in software distribution security, as conventional models lack integrated tamper-detection and rollback mechanisms.

To realize this implementation, certain requirements should be considered. First, the data should be accessed via a unified application programming interface (API) architecture regardless of what the original data formats were or whether the data were of private (e.g. enterprise) or public nature. Second, the compute resources (e.g., general compute or large language model(LLM) compute) should be available to the SoftIP developer 702 directly or through the SoftIP Cloud Host Provider 713. Third, in deployment phase, the SoftIP assets should be possible to be executed by a third party independent host that has access to the same compute and data resources. Fourth, security is of paramount importance in this solution. Every party to the system should be regularly authenticated and authorized. Every code needs to be signed by a third party Certificate Authority 710. Every code and its revisions should be cryptographically signed and escrowed at a third party to ensure code synchronization and avoid code tampering. These cryptographic code integrity controls mean that software packages and revisions are cryptographically signed using certificates issued by trusted certificate authorities (i.e., Certificate Authority 710). Submissions undergo hash verification and are escrowed securely prior to execution. Fifth, once a SoftIP code is in production, the code upgrade by the developer does not get automatically pushed to the SoftIP Clients 712. Such upgrade and revisions first must go through various steps to ensure revised code integrity and sand-boxed execution. Then the changes must be recorded in the security network. Sixth, a SoftIP ready for deployment must indicate exact resources it requires and provide unique identifier for these resources (e.g. data, network, compute, memory).

This disclosure offers an end-to-end system architecture 100 to enable companies to create differentiating capabilities rapidly by tapping into a large pool of independent software vendors (ISV) while protecting enterprise's proprietary digital assets (such as data) and ISV's developed intellectual property (SoftIP). In addition, this disclosure enables the SoftIP to be executed at various locations using advanced compute resources such as a Large Language Model (LLM) infrastructure described with reference to FIGS. 3-6 above. The SoftIP Developers 702 may monetize their SoftIP through a specialized SoftIP Store 706 or through a specificized blockchain network 718 that can keep track of identities, required resources/data, and software revisions.

In commercial realization specified in this disclosure, it is possible that several logical functions (such as SoftIP Cloud Host Provider 713, Certificate Authority 710, and SoftIP Escrow Provider 709) to be offered by the same business entity.

Figure 8:
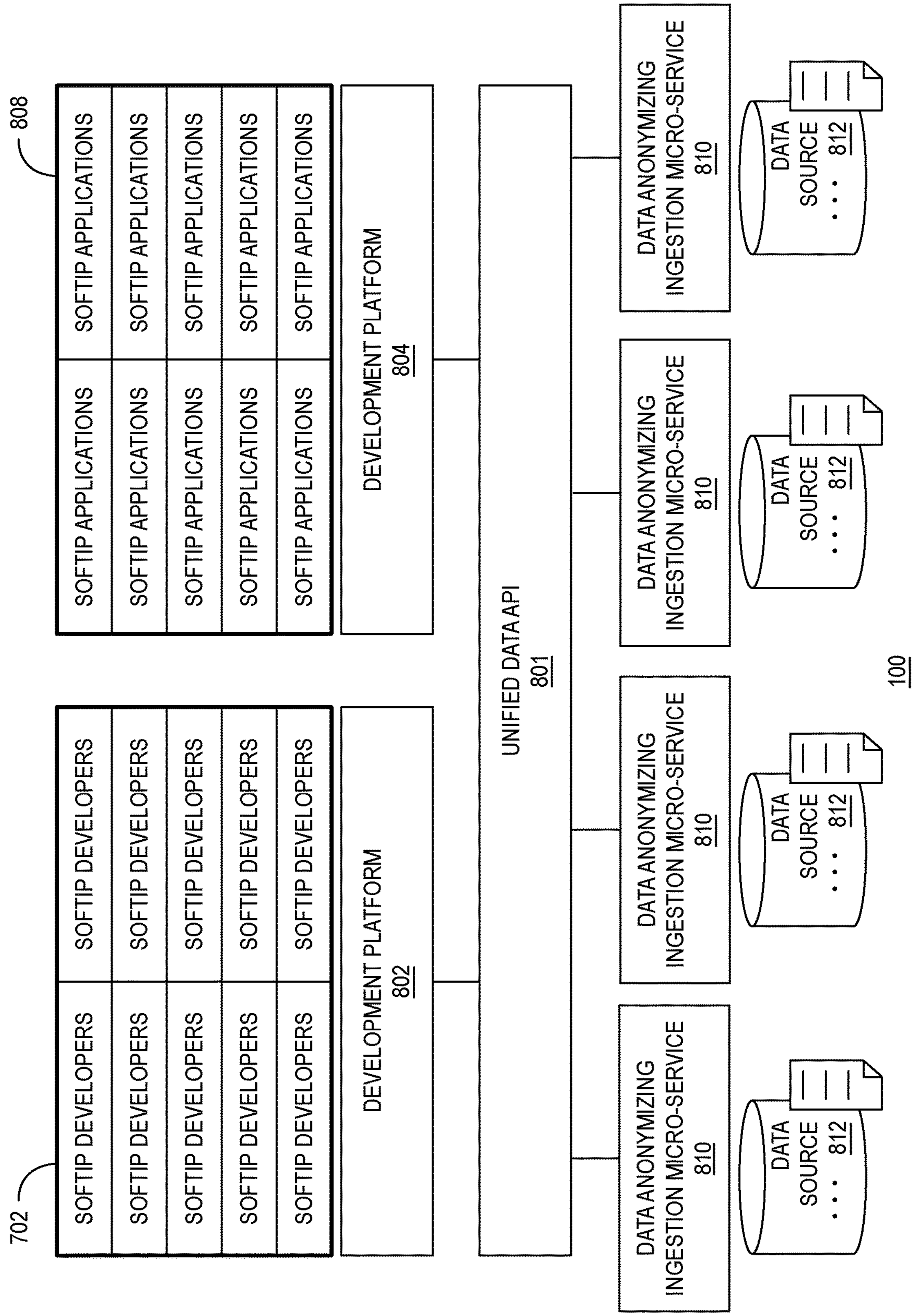
FIG. 8 illustrates data architecture.

FIG. 8 illustrates data architecture of the SaaIP system and method 100. In order to ensure compatibility and seamless code portability, it is necessary that SoftIP Developer 702 uses an identical environment to that of SoftIP Cloud Host Provider 713. The environment here includes programming languages as well as resources used by the developed SoftIP. The resources include compute, storage, input/output, and data as described in FIG. 1. SoftIP Clients 712 may have their own proprietary data that may desire the SoftIP Developer 702 to use. As data sources could be quite diverse with varying formats, it is required to provide an abstraction layer to hide the process of data ingestion microservices operation and provide a Unified Data Application Programmable Interface (API) 801 to the SoftIP Developers 702. This Unified Data API 801 enables SoftIP code portability and simple execution in SoftIP Cloud Host Provider 713. To achieve this, the SoftIP Cloud Host Provider 713 provides a development platform identical to the deployment platform by harmonizing access the data through the Unified Data API 801. This data API unification hides the complexity of heterogenous data that may have a verity of formats from private and public sources. References 802 and 804 show development platforms coupled to the Unified Data API 801. Development platform 802 is connected to SoftIP Developers 702 and development platform 804 is connected to SoftIP Applications 808. Data anonymizing ingestion microservices 810 are coupled to Unified Data API 801 and data sources 812.

The SaaIP system and method 100 has standardized resource access via unique identifiers. By introducing Mandatory Unique Data Identifiers (MUDIs), Mandatory Unique Resource Identifiers (MURIs), Unique Code Identifiers (UCIs), and Code Revision Numbers (CRNs), the SaaIP system and method 100 standardizes how compute resources, proprietary digital assets (e.g., data assets), and software versions are identified and controlled within distributed systems. This improves the precision and enforceability of resource management, allowing enterprises to tightly control what data and compute resources any third-party code can access, thereby reducing attack surfaces and compliance risks.

The SaaIP system and method 100 features seamless developer Integration with certificate-based identity management. The SaaIP system and method 100 provides a secure, certificate-based onboarding process for SoftIP Developers 702, ensuring that only authenticated and verified SoftIP Developers 702 can submit code for execution or licensing. This prevents impersonation and unauthorized code submissions, which are vulnerabilities in existing models that rely on less rigorous developer validation.

Figure 9A:
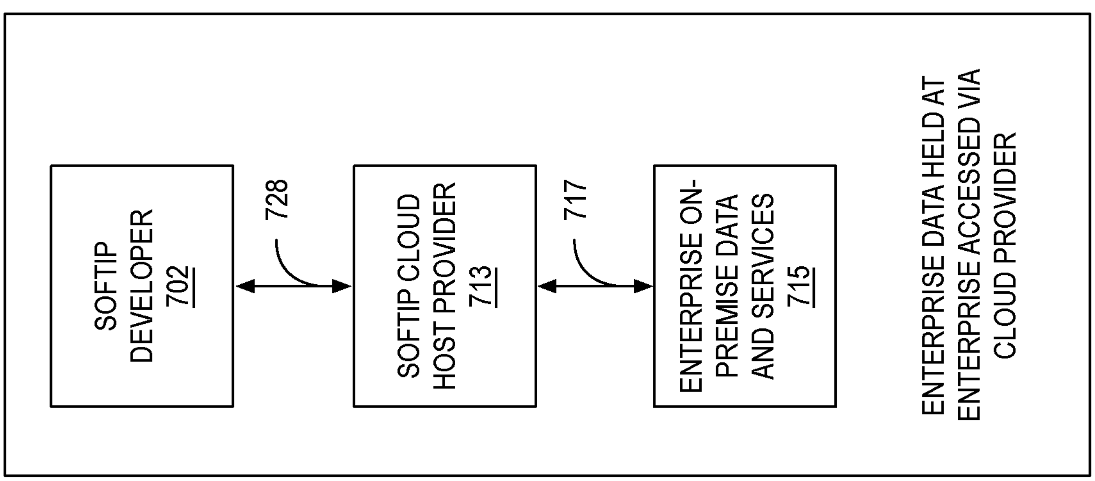
FIGS. 9A-9C illustrates data access flows.
Figure 9B:
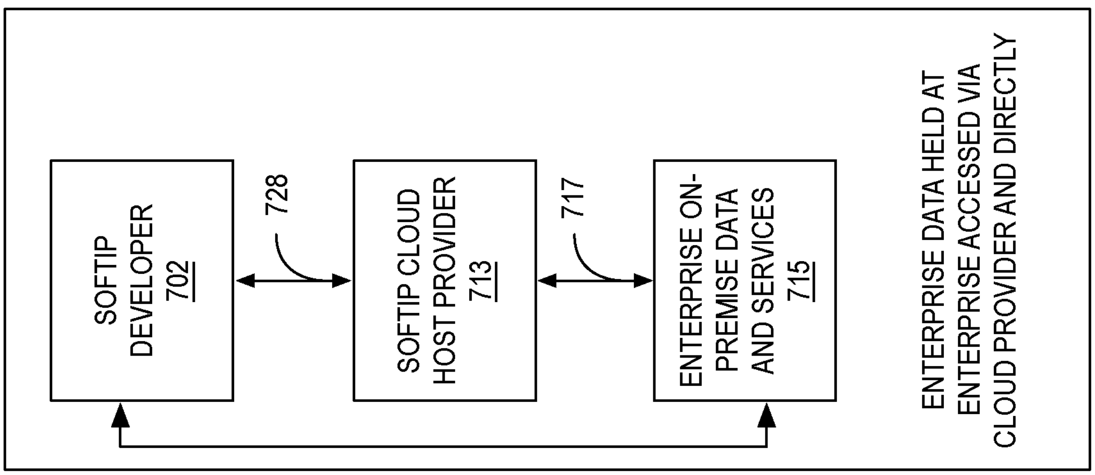
Figure 9C:
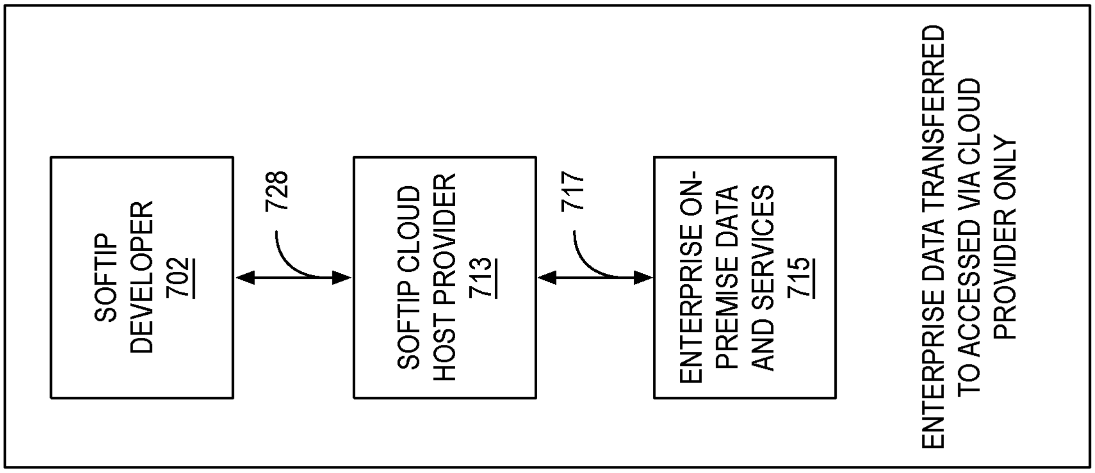

FIGS. 9A-9C illustrate data access flow in the method and system 100. Private data is sensitive for competitive and other reasons. The private data should remain in full control of the proprietary digital assets (e.g., data) and may still physically maintain hosting the data at its own premises. FIGS. 9A-9C highlight three possibilities of private data flow and access to the SoftIP developers 702 and code execution. FIG. 9A shows enterprise on-premise data and services (CACDA 715 in FIG. 7B) held at enterprise accessed by the independent SoftIP Developer 702 through a certified API (data/service and control) 728 coupled to the Cloud Host Provider 713 and a business to business (B2B) API 717. The Cloud Host Provider 713 is a cloud sandbox workplace provider. FIG. 9B shows enterprise on-premise data and services 715 held at an enterprise and accessed via the Cloud Host Provider 713 and directly. FIG. 9C shows enterprise cloudified enterprise data and services 715 accessed via Cloud Host Provider 713 only.

Figure 10:
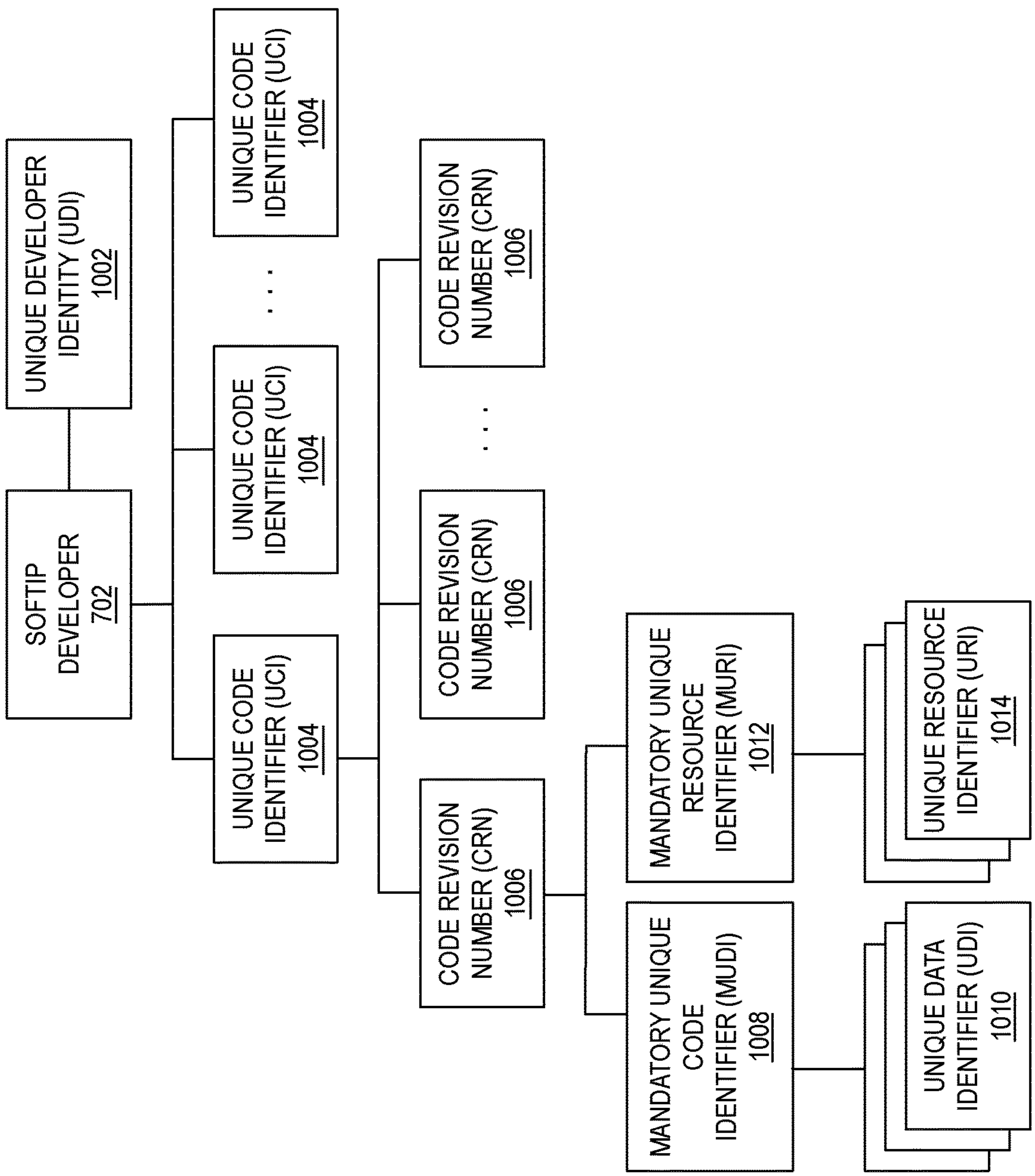
FIG. 10 illustrates identity mapping.

FIG. 10 highlights the hierarchy of identities required to address multiple SoftIP Developers 702, codes, revisions, and required data and resources to execute SoftIP codes (i.e., identity management). Each SoftIP Developer 702 gets a Unique Developer Identity (UDI) 1002 to be able to publish and certify SoftIP assets it develops. A SoftIP Developer 702 may develop multiple SoftIP assets singularly distinguished by Unique Code Identifier (UCI) 1004. As the SoftIP Developers 702 evolve codes, each revision of the code is tagged by Code Revision Number (CRN) 1006. Reference 1008 identifies a Mandatory Unique Data Identifier (MUDI) 1008 and a Unique Data Identifier 1010. Each code revision may require specific resource needs (data or compute) and each resource is identified by Mandatory Unique Resource Identifier (MURI) 1012 that could map to more granular resource identifier tagged by Unique Resource Identifier (URI) 1014.

Accordingly, the SaaIP system and method 100 addresses several technical problems: preventing tampering and unauthorized modification of third-party software deployed within enterprise environments; ensuring controlled access to sensitive data and compute resources during execution of third-party code; providing standardized, verifiable identity management for software components, developers, clients, and associated digital resources; enabling immutable, tamper-resistant recording of software licensing, deployment, and execution events; and facilitating secure onboarding of SoftIP Developers 702 via certificate-based authentication protocols. The disclosed SaaIP system and method 100 solves these problems through the use of standardized resource and identity management. The system assigns and manages unique identifiers for code packages (UCIs) 1004, revisions (CRNs) 1006, developers (UDIs) 1002, data (MUDIs) 1008, and resources (MURIs) 1012, ensuring precise tracking and control over software execution parameters.

Benefits of the method and system 100 include the following technical advantages:

1) Tamper-Resistance and Authenticity:

Prevents code tampering via mandatory cryptographic verification at all stages of submission, revision, and execution.

2) Secure, Controlled Execution:

Third-party code runs in verified, sandboxed environments without direct access to sensitive enterprise infrastructure.

3) Immutable Auditability:

Blockchain integration provides transparent, verifiable, and immutable record-keeping of all licensing and execution events.

4) Precise Resource Access Control:

Standardized identifiers allow enforcement of exact data and compute resource access permissions, improving system security and compliance.

5) Reduced Intellectual Property Theft Risk:

Developers retain control over their intellectual property, even when their software executes within third-party environments.

6) Trusted Software Marketplace:

The system supports a SoftIP Store 706, where software packages can be securely listed, licensed, and distributed, fostering an ecosystem of trust among developers and enterprise clients.

Figure 11:
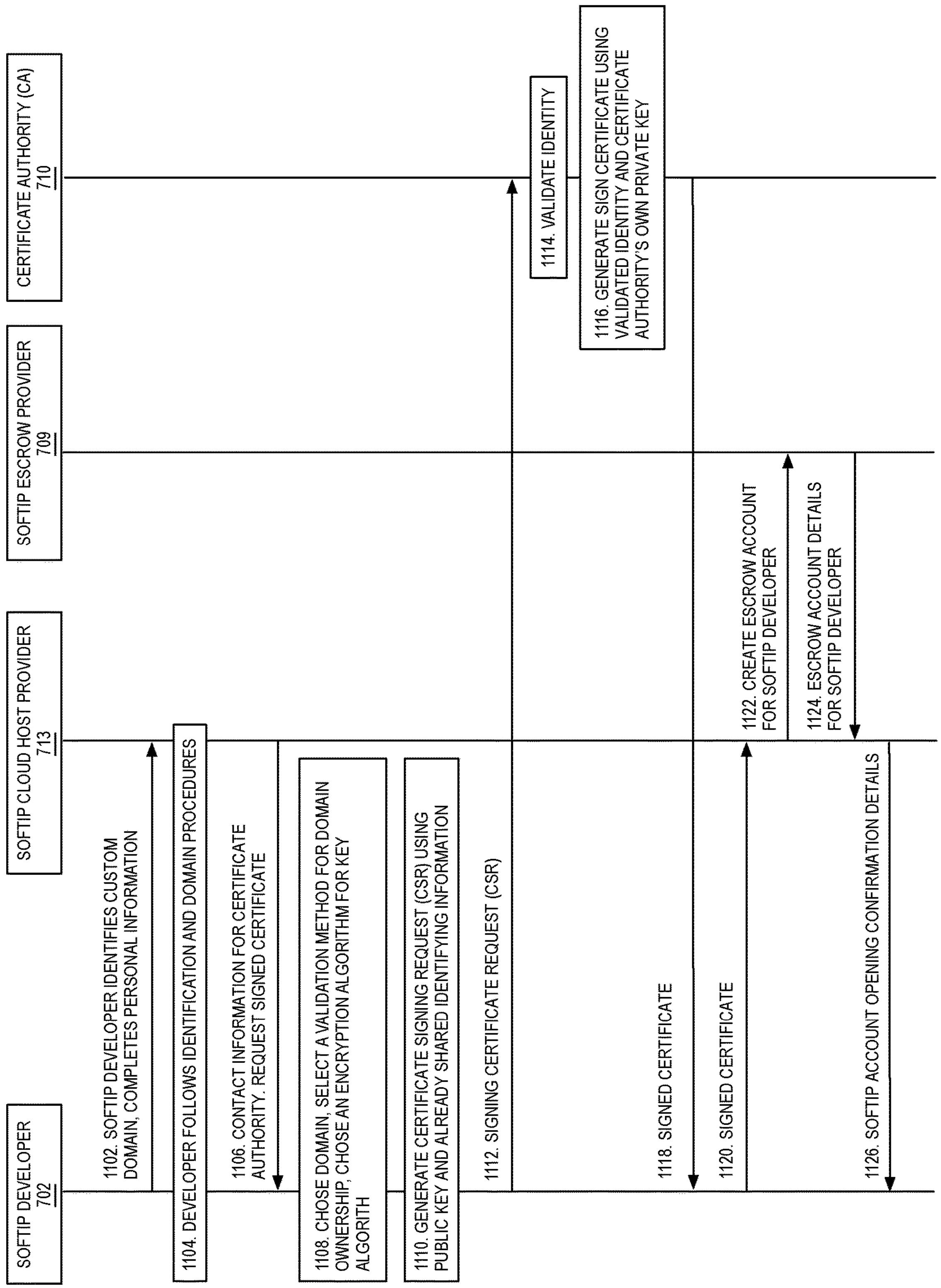
FIG. 11 illustrates a Software Intellectual Property (SoftIP) Developer initial signup procedure.

FIG. 11 illustrates a SoftIP developer 702 initial signup procedure. The signaling charts demonstrates examples of interaction between the logical entity to provide a complete solution. In order to provide a concrete and secure infrastructure for executing mission critical code, the SoftIP Developer 702 s required to register and validate its organization and domain to the SoftIP Cloud Provider 713. This process may require digital and non-digital steps to validate identity. In step 1102, SoftIP Developer 702 identifies custom domain and completes personal information with the SoftIP Cloud Host Provider 713. In step 1104, the SoftIP Developer 702 follows identification and domain validation procedures. In step 1106, contact information for certificate authority 710 and requests a signed certificate. In step 1108, the SoftIP Developer 702 choses domain, selects a validation method for domain ownership, and chooses an encryption algorithm for the key algorithm. In step 1110, generate a certificate signing request (CSR) using Public Key and already shared identifying information. In step 1112, a signing certificate request (CSR) is sent from the SoftIP Developer 702 to the certificate authority 710. By secure developer onboarding; the SoftIP Developers 702 undergo certificate-based identity verification using domain ownership protocols and certificate signing requests (CSRs), ensuring that only authenticated entities can submit software into the system. In step 1114, the certificate authority 710 validates the identity of the SoftIP Developer 702. In step 1116, the certificate authority 710 generates a sign certificate using validated identity the Certificate Authority's 710 own private key. In step 1118, the Certificate Authority 710 issues a signed certificate to the SoftIP Developer 702. In step 1120, the SoftIP Developer 702 sends the signed certificate to the SoftIP Cloud Host Provider 713. In step 1122, the SoftIP Host Cloud Provider 713 creates an escrow account for the SoftIP Developer 702 with the SoftIP Escrow Provider 709. In step 1124, the SoftIP Escrow Provider 709 sends the escrow account details for the SoftIP Developer 702 to the SoftIP Cloud Host Provider 713. In step 1126, the SoftIP Cloud Host Provider 713 sends to the SoftIP Developer 702 the SoftIP Developer 702 account opening confirmation details.

Figure 12:
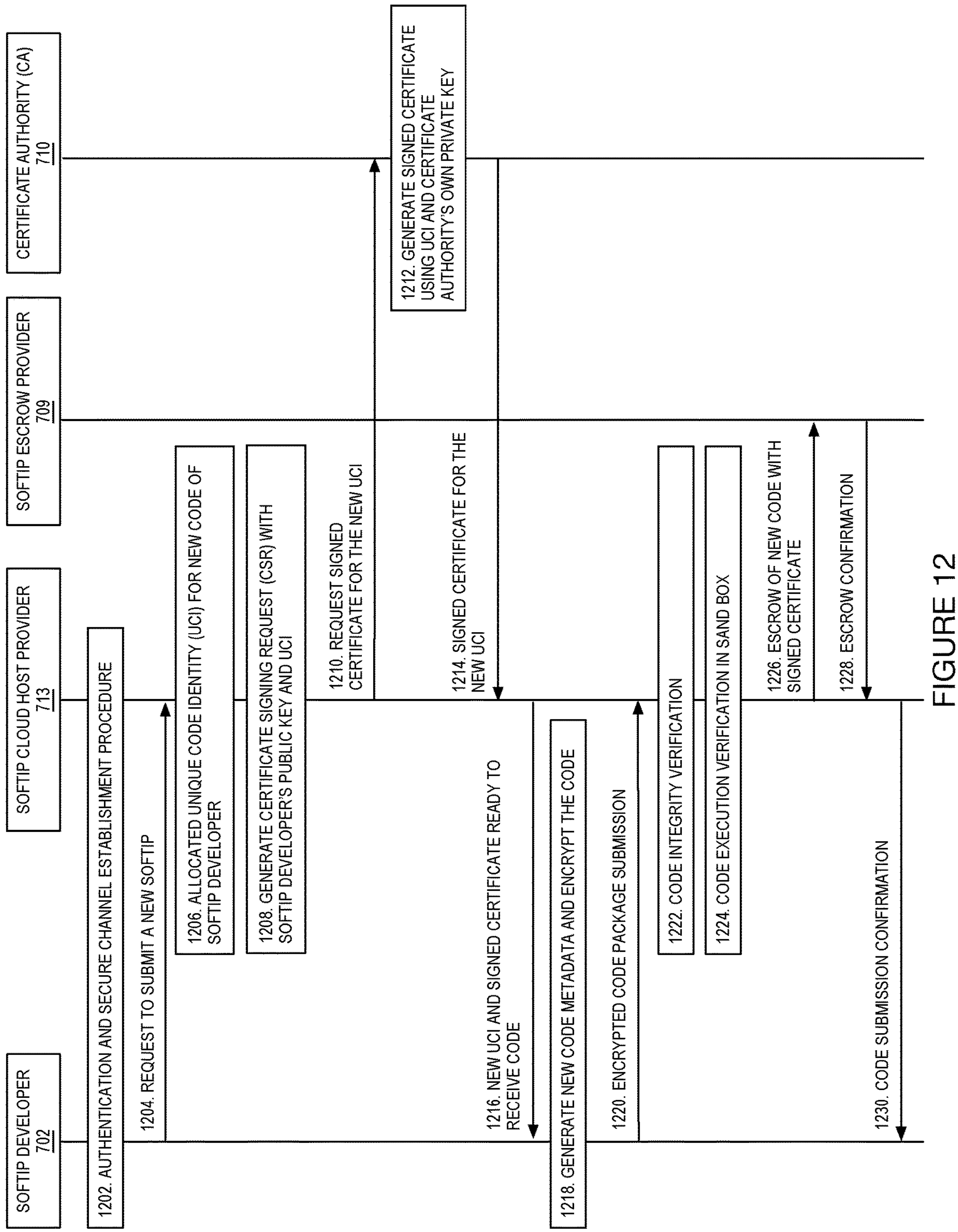
FIG. 12 illustrates a SoftIP initial code commit procedure.

FIG. 12 illustrates SoftIP initial code commit procedure. Step 1202 is an authentication and a secure channel establishment procedure process between the SoftIP Developer 702 and the SoftIP Cloud Host Provider 713. Step 1204 is a request to submit a new SoftIP from the SoftIP Developer 702 and the SoftIP Cloud Host Provider 713. Step 1206 is an allocated unique code identity (UCI) 1004 for new code of SoftIP Developer 702. In Step 1208, the SoftIP Cloud Host Provider 713 generates certificate signing request (CSR) with the SoftIP Developer's 702 public key and UCI 1004. In step 1210, the SoftIP Cloud Host Provider 713 requests a signed certificate for the new UCI 1004 from Certificate Authority 710. In step 1212, the Certificate Authority 710 generates a signed certificate using the UCI 1004 the Certificate Authority's 710 own private key. In step 1214, the signed certificate for the new UCI 1004 is sent from the Certificate Authority 710 to the SoftIP Cloud Host Provider 713. In step 1216, the new UCI 1004 and signed certificate are sent from the SoftIP Cloud Host Provider 713 to the SoftIP Developer 702. The SoftIP Developer 702 is now ready to receive the code. In step 1218, the SoftIP Developer 702 generates a new code metadata and encrypts the code. In step 1220, an encrypted code package submission is sent from the SoftIP Developer 702 to the SoftIP Cloud Host Provider 713. In step 1222, the SoftIP Cloud Host Provider 713 performs code integrity verification. In step 1224, the SoftIP Cloud Host Provider 713 performs code execution verification in a sand box. In step 1226, the SoftIP Cloud Host Provider 713 requests the escrow of the new code with a signed certificate from the SoftIP Escrow Provider 709. In step 1228, an escrow confirmation is sent from the SoftIP Escrow Provider 709 to the SoftIP Cloud Host Provider 713. In step 1230, the SoftIP Cloud Host Provider 713 sends a code submission confirmation to the SoftIP Provider 702.

Figure 13:
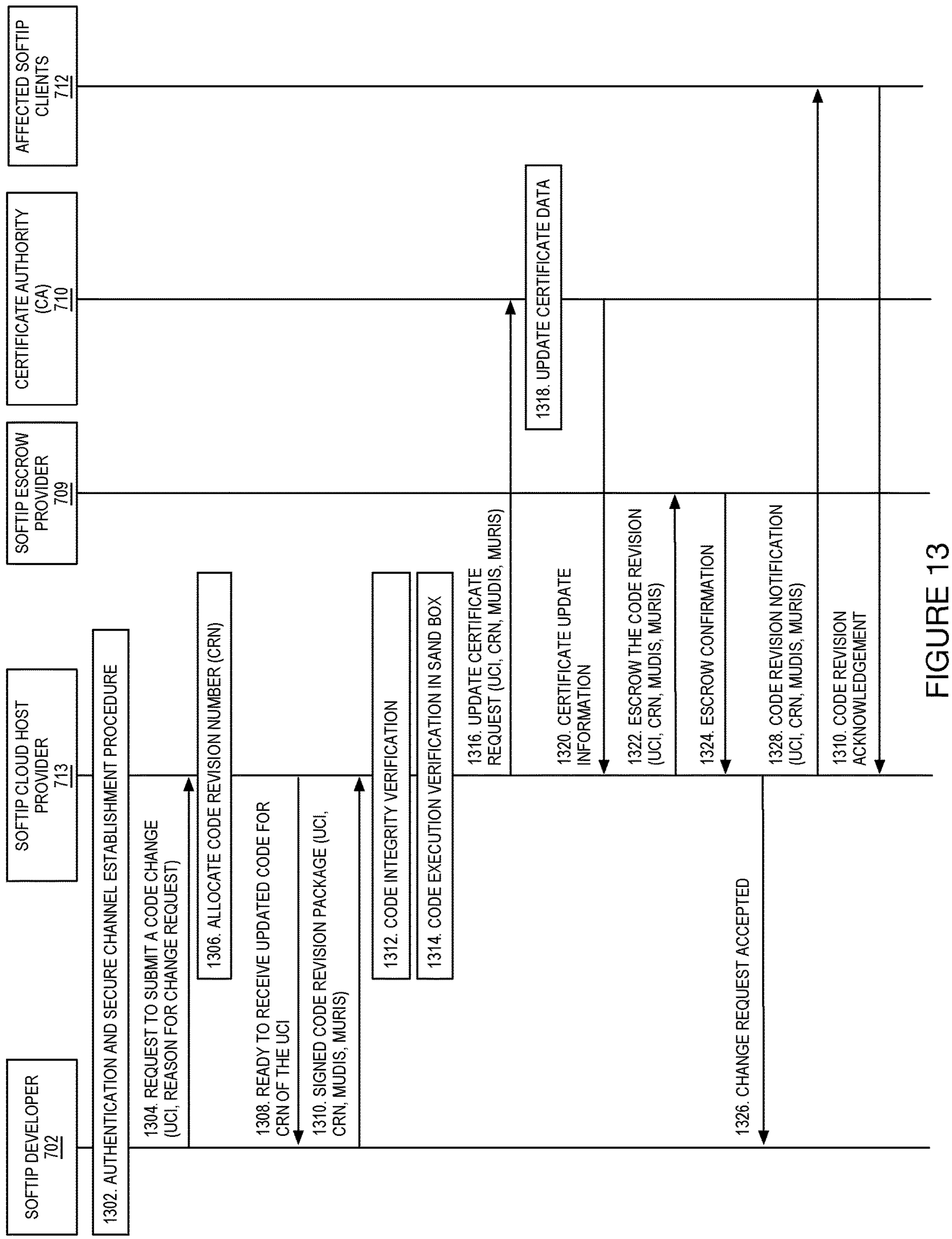
FIG. 13 illustrates a SoftIP code change request procedure.

FIG. 13 illustrates SoftIP code change request procedure. In step 1302, the authentication and secure channel establishment procedure between the SoftIP Developer 702 and the SoftIP Cloud Host Provider 713 takes place. In step 1304, is a request to submit a code change from the SoftIP Developer 702 and the SoftIP Cloud Host Provider 713. The UCI 1004 is the reason for the change request. In step 1306, the SoftIP Cloud Host Provider 713 allocates code revision number (CRN) 1006. In step 1308, the SoftIP Cloud Host Provider 713 signals the SoftIP Developer 702 that it is ready to receive updated code for CRN 1006 of the UCI 1004. In step 1310, a signed code revision package is sent from the SoftIP Developer 702 to the SoftIP Cloud Host Provider 713 (Mandatory Unique Data Identifiers (MUDIs) 1008 and Mandatory Unique Resource Identifier (MURIs) 1012). In step 1312, in SoftIP Cloud Host Provider 713 there is a code integrity verification. In step 1314, SoftIP Cloud Host Provider 713 the code execution verification takes place in a sandbox. In step 1316, an update certificate request is sent from the SoftIP Cloud Host Provider 713 to the Certificate Authority 710 (UCI 1004, CRN 1006, MUDIs 1008, MURIs 1012). In step 1318, the certificate data is updated. In step 1320, the certificate update information is sent from the Certificate Authority 710 to the SoftIP Cloud Host Provider 713. In step 1322, SoftIP Cloud Host Provider 713 requests that the SoftIP Escrow Provider 709 escrows the code revision (UCI 1004, CRN 1006, MUDIs 1008, MURIs 1012). In step 1324, the escrow confirmation is sent to the SoftIP Cloud Host Provider 713 from the SoftIP Escrow Provider 709. In step 1326, the SoftIP Cloud Host Provider 713 sends change request accepted to the SoftIP Developer 702. In step 1328, from the SoftIP Cloud Host Provider 713 sends a code revision notification is sent to the affected SoftIP Clients 712 (UCI 1004, CRN 1006, MUDIs 1008, MURIs 1012). In step 1330, a code revision acknowledgement is sent from the affected SoftIP Client 712 to the SoftIP Cloud Host Provider 713.

Figure 14:
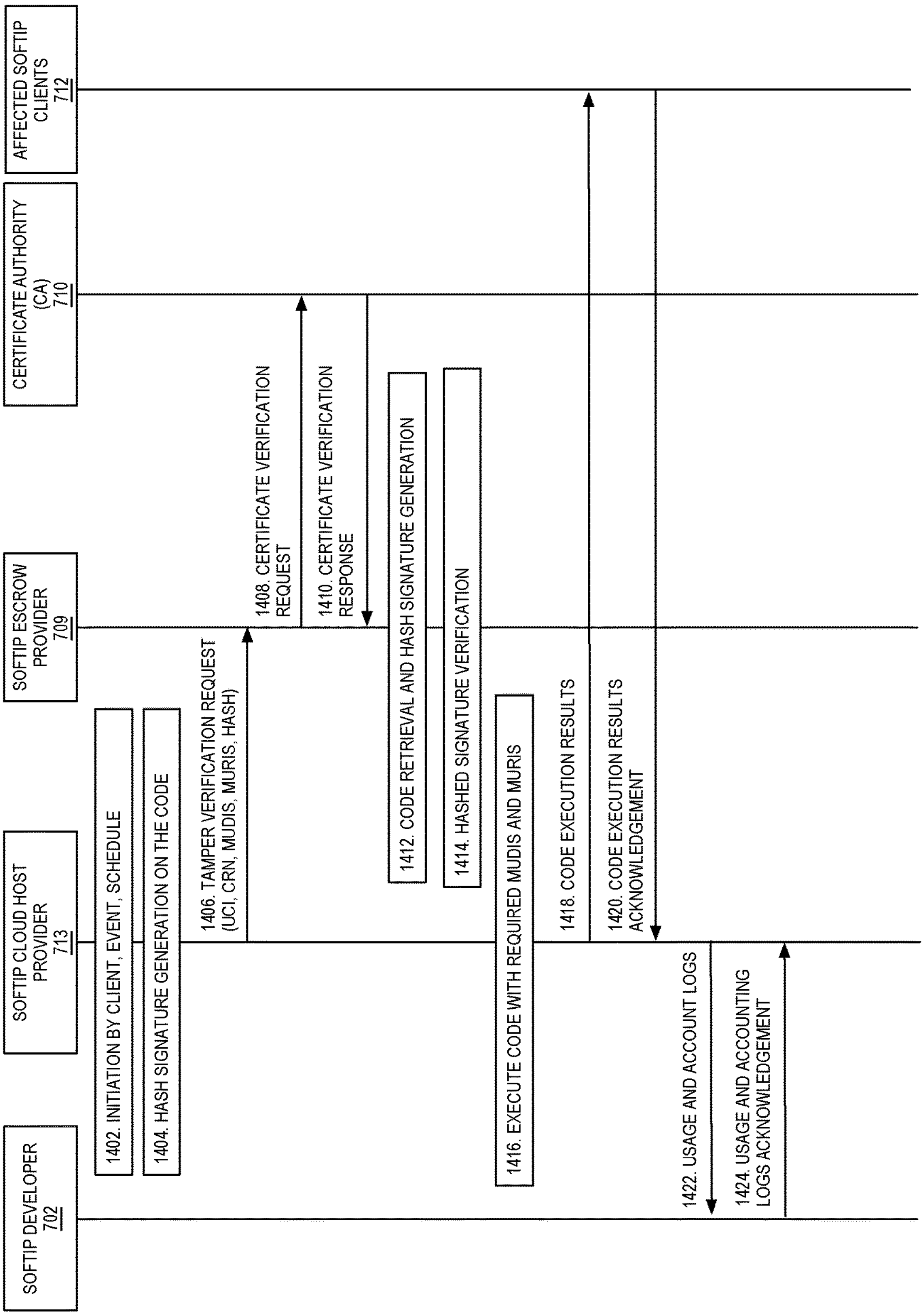
FIG. 14 illustrates a SoftIP hosted code execution procedure.

FIG. 14 illustrates SoftIP hosted code execution procedure. In step 1402, SoftIP Cloud Host Provider 713 there is initiation by SoftIP Client 712, event and schedule. In step 1404, also in the SoftIP Cloud Host Provider 713, hash signatures generation on the code. In step 1406, the SoftIP Cloud Host Provider 713 sends a tamper verification request (UCI 1004, CRN 1006, MUDIs 1008, MURIs 1012, hash) to the SoftIP Escrow Provider 709. In step 1408, the SoftIP Escrow Provider 709 sends a certificate verification request to the Certificate Authority 710. In step 1410, the Certificate Authority 710 sends the certificate verification response to the SoftIP Escrow Provider 709. In step 1412, at the SoftIP Escrow Provider 709 code retrieval and hash signature generation. In step 1414, at the SoftIP Escrow Provider 709 hashed signature verification takes place. In step 1416, at the SoftIP Cloud Host Provider 713, executes code with the required MUDIs 1008 and MURIs 1012. In step 1418, the SoftIP Cloud Host Provider 713 sends the code execution results to the SoftIP Client 712. In step 1420, the SoftIP Client 712 sends to the SoftIP Cloud Host Provider 713 code execution results acknowledgement. In step 1422, usage and account logs are sent from the SoftIP Cloud Host Provider 713 to the SoftIP Developer 702. In step 1424, an acknowledgement of the usage and account logs is sent from the SoftIP Developer 702 to the SoftIP Cloud Host Provider 713.

Figure 15:
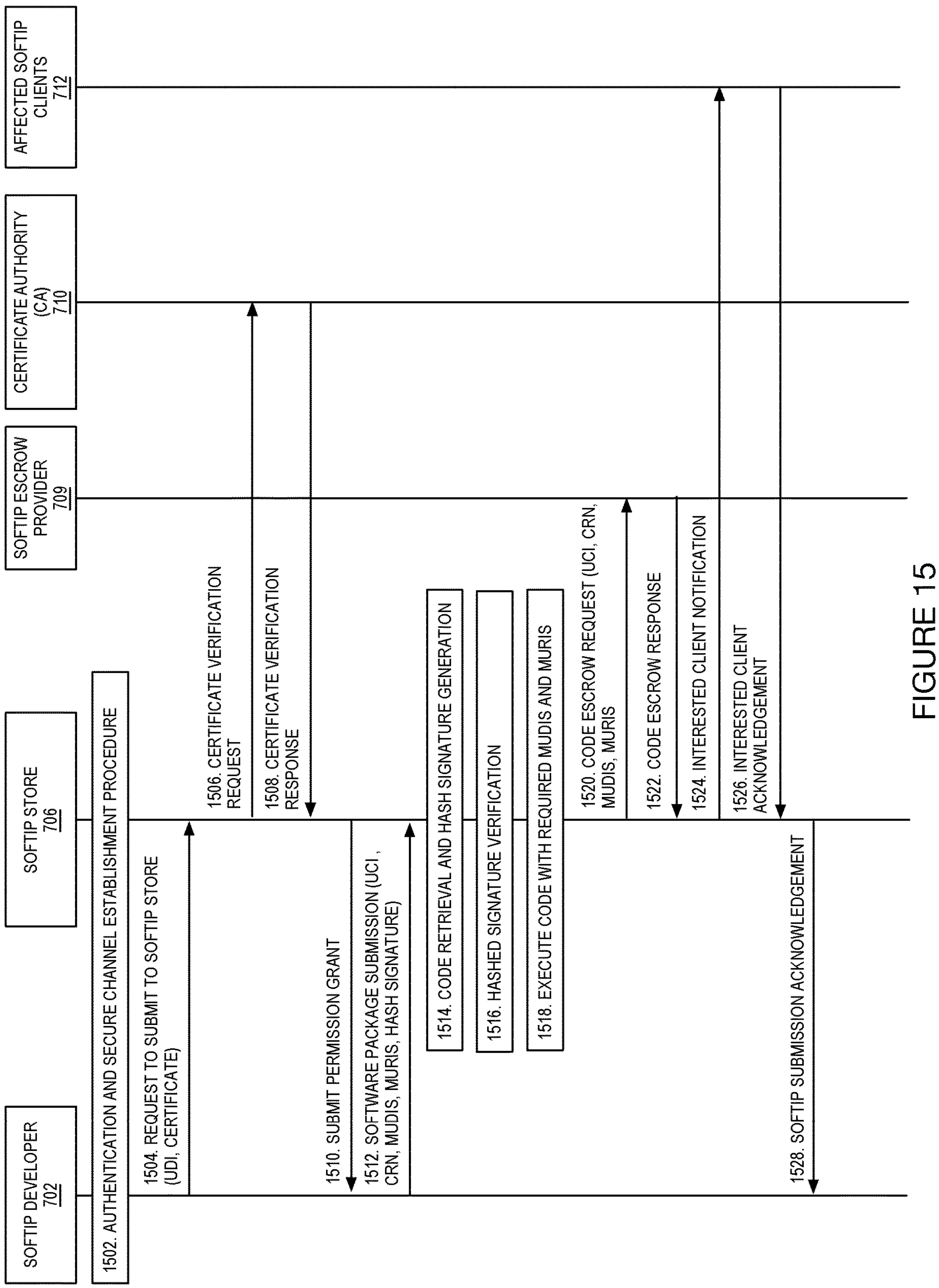
FIG. 15 illustrates a SoftIP store submission procedure.

FIG. 15 illustrates a SoftIP store submission procedure. In step 1502, authentication and secure channel establishment procedure takes place between the SoftIP Developer 702 and the SoftIP Store 706. In step 1504, the SoftIP Developer 702 makes a request to submit (UDI 1004, certificate) to SoftIP Store 706. In step 1504, request to submit to SoftIP Store (UDI 1004, certificate). In step 1506, the SoftIP Store 706 sends a certificate verification request to the certificate authority 710. In step 1508, the certificate authority 111 sends a certificate verification response to the SoftIP Store 106. In step 1510, the SoftIP Store 706 submits a permission grant to the SoftIP Developer 702. In step 1512, a software package submission (i.e., UCI 1004, CRN 1006, MUDIs 1008, MURIs 1012, hash signature) is sent from the SoftIP Developer 702 to the SoftIP Store 706. In step 1514, at the SoftIP Store 706 a code retrieval and hash signature is generated. In step 1516, there is a hashed signature verification at the SoftIP Store 706. In step 1518, execute code with required MUDIs 1008 and MURIs 1012 at the SoftIP Store 706. In step 1520, code escrow request (UCI 1004, CRN 1006, MUDIs 1008, MURIs 1012) is made from the SoftIP Store 706 to the SoftIP Escrow Provider 709. In step 1522, a code escrow response is sent from the SoftIP Escrow Provider 709 to the SoftIP Store 706. In step 1524, an interested client notification is sent from the SoftIP Store 706 to SoftIP Clients 712. In step 1026, an acknowledgement of the interested client notification is sent the SoftIP Clients 712 to the SoftIP Store 706. In step 1528, a SoftIP submission acknowledgement is sent from the SoftIP Store 706 to the SoftIP Developer 702.

Another feature of this disclosure is for the ability to run the SoftIP code in a third party secure cloud providers (SoftIP Cloud Host Provider 713) and send the results of executing the SoftIP code (such as trading signals) to the SoftIP Client 712 without the SoftIP client 712 ever seeing the SoftIP code. The SoftIP code may use SoftIP Client 712 proprietary data and resources such as LLM. To ensure consistency, the SoftIP code is frozen and recorded to an escrow provider (SoftIP Escrow Provider 709) and all changes initiated by the SoftIP Developer 702 have to be approved by the SoftIP Client 712.

The disclosed SaaIP system and method 100 offers a secure, scalable, and auditable system for managing the entire lifecycle of third-party software, from SoftIP Developer 702 onboarding through code execution and monetization, addressing persistent technical challenges in modern software licensing and cloud deployment. Further, the method and system 100 delivers practical, technological improvements over prior art models by applying cryptography, distributed ledgers 718A, secure computing environments, and standardized resource identifiers to enable controlled, verifiable execution of third-party code within enterprise systems.

Examples of technical problems and technical solutions addressed by the SaaIP system and method 100 are given in the following paragraphs. A technical problem in this field is secure, controlled deployment of third-party software in enterprise environments. Enterprises face challenges deploying third-party software while protecting proprietary data and ensuring control over code execution environments. Current models (licensed software, Software-as-a-Service (SaaS), or in-house development) compromise either flexibility, control, or IP protection. The SaaIP system and method 100 provides a technical solution by implementing a blockchain-Integrated SoftIP license transfer and execution system. Using a blockchain ledger 718A for immutable recording of license transfers, resource allocations, and code revisions provides a secure, decentralized solution to tracking and verifying software distribution and execution.

A technical problem in this field is preventing intellectual property misuse and code tampering. Independent software vendors (ISVs) lack secure, verifiable mechanisms to distribute their software without risking IP theft or unauthorized modification. Enterprises similarly lack trust mechanisms to validate incoming third-party code. The SaaIP system and method 100 provides a technical solution by cryptographically controlled code submission, escrow, and execution framework code packages are cryptographically signed, escrowed, and verified before execution, preventing tampering and ensuring code authenticity. Execution occurs only after signature and certificate validation.

A technical problem in this field is data privacy and controlled access to sensitive enterprise resources. Enterprises are unable to safely expose sensitive, on-premise, or cloud data to third-party code without risking unauthorized access or data leakage. The SaaIP system and method 100 provides a technical solution for a unified resource identity framework (UCIs 1004, CRNs 1006, MUDIs 1008, MURIs 1012). Standardized identifiers for data, resources, developers, and code revisions allow precise control and tracking of what code runs where, with what inputs, and when. Sandboxed, verified execution via controlled hosting environment.

A technical problem in this field is lack of unified resource identity management for code execution. Complex data and compute resource environments lack standardized, enforceable mechanisms to specify, track, and control what resources third-party code is allowed to access. The SaaIP system and method 100 provides a technical solution by secure developer onboarding and controlled code revisions.

A technical problem in this field is the absence of tamper-proof, auditable software licensing and execution records. Existing licensing models do not provide immutable, verifiable records of license transfers, code revisions, or code execution events. The SaaIP system and method 100 provides a technical solution by having developers onboarded using certificate-based identity verification, and all code changes require cryptographic and procedural validation before deployment.

In summary, this disclosure solves a specific, concrete, and technological problem—secure and verifiable deployment of third-party software in sensitive enterprise environments—using a technical method system 100 as a solution: blockchain-based license tracking, cryptographic verification, standardized resource identifiers, controlled execution environments, and secure API access. This method and system 100 constitutes a practical application of cryptography, distributed ledgers 718A, secure computing environments, and controlled APIs to address longstanding technical deficiencies in software licensing, execution control, and data security.

Aspects of the disclosure include a fusion of intellectual property (IP) protection, secure execution, and monetization into one system architecture that allows enterprises to safely use third-party artificial intelligence and software (AI/software) while giving independent software vendors (ISVs) a secure way to distribute and profit from their innovations.

- Software-as-Intellectual Property (SaaIP) Concept: Treating software modules (especially artificial AI/ML models) as portable, protected, monetizable intellectual property, not just a service or a license.
- Unified Data API Across Sources: A single API 801 that hides data heterogeneity (private/public, multiple formats) while maintaining security and ownership.
- Compute Abstraction Including LLM Infrastructure: Explicit support for modern AI workloads by integrating LLM-specific compute resources into the framework:
- Third-Party Escrow+Code Signing System: Independent escrow providers 709 hold cryptographically signed code and revisions, preventing tampering while ensuring synchronization.
- Secure Development-Deployment Parity: Ensures the development environment is identical to production, enforced by certified tools, APIs, and services.
- Sandboxed Upgrade Mechanism: Prevents unverified updates by requiring code revisions to pass integrity checks and be logged in a security network.
- Explicit Resource Identification (MUDI 1008/MURI 1012): Use of Mandatory Unique Identifiers for data and resources to guarantee reproducibility and secure execution.
- Blockchain-Based Licensing & Monetization: Beyond a store, the use of a blockchain and cryptocurrency network 718 for licensing, identity verification, and resource tracking is novel compared to standard application stores.
- Comprehensive Identity Mapping: A hierarchical identity system and method 100 covering developers, codes, revisions, data, and resources—ensuring granular traceability.

This disclosure offers an end-to-end system architecture to enable companies to create differentiating capabilities rapidly by tapping into a large pool of independent software vendors (ISV) while protecting and utilizing enterprise's proprietary digital resources. Examples of such resources include data, compute/storage infrastructure including Large Language Model (LLM) infrastructure. This invention enables complete separation of ISV's developed intellectual property (SoftIP) such as code/processes from enterprise data and resources. In addition, this system enables the SoftIP to be executed at a third party facility secured with advanced cryptographic technologies to ensure code integrity and secure access to enterprise's proprietary digital assets. The developers may monetize their SoftIP through a specialized SoftIP Store to multiple enterprise clients. Alternatively, the ISV could transfer the digital rights to the developed SoftIP through a specificized blockchain network that can keep track of identities, required resources, and software revisions where the ISV may still evolve the developed SoftIP while at the same allowing the enterprise client to use the latest revisions of the SoftIP approved by the enterprise client.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Further aspects of the disclosure include a method for transferring software-as-an-intellectual-property (SoftIP) licenses comprising: receiving, by a SoftIP store, a code package submission from a SoftIP developer including a unique developer identifier (UDI) and certificate; verifying the developer certificate using a certificate authority; generating a unique code identifier (UCI) and cryptographically signing the code package; escrow-storing the code package via a SoftIP escrow provider; publishing the software package to a SoftIP store; and notifying potential clients of the availability of the code package for transfer or output licensing. Wherein the SoftIP store further encrypts the code package using the developer's public key prior to storing the software package in the escrow. Wherein client access to code execution is permitted only after verifying certificate chains for both the SoftIP developer and a SoftIP client via the certificate authority. Wherein tamper detection comprises comparing the generated hash signature of the requested code against an escrowed code signature prior to execution. Wherein the results of code execution are transmitted to the client through a secure authenticated channel using secure encryption protocols. Wherein peer-to-peer license transfers are automatically recorded in a distributed blockchain ledger, enabling auditability and tamper-resistant tracking of software transactions.

Further aspects of the disclosure include a method of code execution verification in a SoftIP system, comprising: receiving a code execution request from a client; generating a hash signature of the code package at a SoftIP cloud host provider; verifying the hash signature and certificate chain through a SoftIP escrow provider and a certificate authority; executing the verified code package using certified compute resources and data services as identified by mandatory resource identifiers; and transmitting the execution results to the client. Wherein the SoftIP cloud host provider maintains a sandboxed environment for verifying code execution prior to production deployment. Further comprising recording execution event data in a blockchain ledger including unique code identifier (UCI), code revision numbers (CRN), mandatory unique data identifiers (MUDIs), mandatory unique resource identifiers (MURIs), and execution timestamps.

Aspects of the disclosure further include a system for decentralized peer-to-peer transfer of software-as-an-intellectual-property (SoftIP) licenses, comprising: a blockchain network configured to manage peer-to-peer license transfer between developers and clients; means for identifying resources and data requirements using mandatory unique resource identifiers and mandatory unique data identifiers; a certificate authority configured to verify identities of participants; and a SoftIP escrow provider configured to verify code integrity prior to license transfer completion.

Aspects of the disclosure further include a method for submitting a software code change in a SoftIP system, comprising: receiving a code change request identifying a unique code identifier (UCI); allocating a code revision number (CRN); receiving an encrypted code revision package containing updated code, mandatory resource identifiers, and data identifiers; verifying code package integrity and executing sandboxed verification; and updating escrow records with a revised code package and cryptographic signatures. Wherein submitting the code revision further comprises generating a certificate signing request (CSR) using the SoftIP cloud host provider's public key. Wherein sandboxed code verification includes executing the software code in an isolated environment identical to the production environment using certified development tools and data application programming interfaces (APIs). Wherein the escrow provider verifies digital signatures on the submitted code revision package prior to updating the escrow storage. Wherein code execution is initiated only after the SoftIP cloud host provider receives a tamper verification confirmation from both the SoftIP escrow provider and the certificate authority.

Aspects of the disclosure include a computer-implemented method for secure distribution and controlled execution of third-party software within an enterprise environment, comprising: receiving, by a SoftIP Cloud Host Provider, a software package submitted by a third-party developer, the software package comprising executable code and associated metadata; performing, by the SoftIP Cloud Host Provider, cryptographic code verification steps comprising: verifying a digital certificate associated with the third-party developer; validating a cryptographic signature associated with the software package; performing a hash verification of the executable code; recording, by the SoftIP Cloud Host Provider, the software package and associated metadata in a secure code escrow system; recording, by a blockchain network, a license transfer event associated with the software package, including a unique code identifier (UCI), code revision number (CRN), and developer identity (UDI); deploying, by the SoftIP Cloud Host Provider, the executable code in a sandboxed execution environment configured to enforce resource access restrictions based on at least one mandatory unique data identifier (MUDI) and at least one mandatory unique resource identifier (MURI); executing, by the SoftIP Cloud Host Provider, the software package in the sandboxed execution environment; recording, by the blockchain network, an execution event associated with the software package, including the UCI, CRN, and resource usage parameters; transmitting, by the SoftIP Cloud Host Provider, execution results to an authorized enterprise client. Wherein the license transfer event and execution event are immutably recorded on a distributed blockchain ledger. Wherein the resource access restrictions comprise verified application programming interfaces (APIs) certified by the SoftIP Cloud Host Provider. Wherein the software package is signed using a certificate issued by a trusted certificate authority after domain ownership validation. Wherein execution of the software package requires pre-verification of a resource manifest specifying required MUDIs and MURIs. Further comprising cryptographically verifying, prior to execution, that the executable code matches the version escrowed in the secure code escrow system. Wherein the execution event record includes a hashed signature generated from the executable code and resource manifest. Wherein the third-party developer is authenticated during submission using a certificate-based identity management process. Wherein resource usage parameters include compute resources, data inputs, and network endpoints required for code execution. Wherein code revisions are processed by allocating a code revision number (CRN), cryptographically verifying the revised code, and updating both the escrow record and blockchain ledger accordingly. Wherein the sandboxed execution environment enforces strict isolation of the executable code from unapproved enterprise data. Wherein the SoftIP Cloud Host Provider transmits post-execution logs to the third-party developer. Further comprising providing, via a SoftIP Store, a marketplace interface for third-party developers to submit, license, and monetize software packages.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes. Although these processes may describe the operations as a sequential process, many of the operations can be performed in parallel or concurrently. In addition, the order of the operations may be rearranged. A process may have additional steps not included in the figures. Also, a number of steps may be undertaken before, during, or after the above elements are considered.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Accordingly, the above description does not limit the scope of the disclosure.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

The foregoing embodiments are presently by way of example only; the scope of the present disclosure is to be limited only by the following claims.

What is claimed is:

1. A method comprising:

running Software Intellectual Property (SoftIP) code in a third party secure cloud provider;

freezing the SoftIP code and recording the SoftIP code to an escrow provider to ensure consistency;

requiring any changes to the SoftIP code initiated by a SoftIP developer to be approved by a SoftIP client; and sending results of executing the SoftIP code to a SoftIP client, wherein the SoftIP client cannot see the SoftIP code nor any data or resources proprietary to the SoftIP developer.

2. A system comprising:

a Software Intellectual Property (SoftIP) cloud host provider configured to run SoftIP code created by a SoftIP developer, control access to resources, and verify code integrity using certified tools and verified resources;

a SoftIP escrow provider configured to receive, store, and verify cryptographically signed software code packages and revisions, wherein the SoftIP escrow provider is configured to freeze the SoftIP code and record the SoftIP code to an escrow provider to ensure consistency;

a SoftIP client capable of receiving results of executing the SoftIP code by the SoftIP cloud host provider, wherein the SoftIP client cannot see the SoftIP code nor any data or resources proprietary to the SoftIP developer; and wherein any changes to the SoftIP code initiated by a SoftIP developer are required to be approved by the SoftIP client.

3. The system of claim 2, further comprising:

a Software Intellectual Property (SoftIP) store configured to register, certify, and distribute software code packages from the SoftIP developer;

a certificate authority configured to issue digital certificates authenticating the SoftIP developer, the SoftIP client, and the SoftIP cloud host provider; and a blockchain network configured to record license transfers, resource identifiers, and code revision identifiers for peer-to-peer transfers.

4. The system of claim 2, wherein the software code modules comprise machine learning models that are treated as portable, protected, and monetizable intellectual property.

5. The system of claim 2, further comprising a single unified data application programming interface (API) configured to hide data heterogeneity while enforcing security and data ownership.

6. The system of claim 2, wherein the SoftIP cloud host provider is further configured to support compute abstraction for artificial intelligence workloads by integrating large language model (LLM) specific computer resources into a framework.

7. The system of claim 2, wherein the SoftIP escrow provider is further configured to prevent tampering and ensuring synchronization by requiring independent storage of cryptographically signed code and synchronized revisions.

8. The system of claim 2, wherein the SoftIP cloud host provider enforces secure development deployment parity by requiring execution environments to utilize certified tools, application programming interfaces (APIs), and services identical to those used in development.

9. The system of claim 2, further comprising a sandboxed upgrade mechanism configured to restrict deployment of unverified code revisions until integrity checks are satisfied and logging in a security network is completed.

10. The system of claim 2, further comprising a hierarchical identity mapping framework associating developers, code modules, revisions, datasets, and resources to provide granular traceability.

* * * * *